United States Patent
Islamov et al.

(10) Patent No.: US 11,824,999 B2
(45) Date of Patent: Nov. 21, 2023

(54) CHOSEN-PLAINTEXT SECURE CRYPTOSYSTEM AND AUTHENTICATION

(71) Applicant: WINKK, INC, Menlo Park, CA (US)

(72) Inventors: Rustam Islamov, Fremont, CA (US); Roustem Akhiarov, Fremont, CA (US)

(73) Assignee: Winkk, Inc., Menlo Park, CA (US)

( * ) Notice: Subject to any disclaimer, the term of this patent is extended or adjusted under 35 U.S.C. 154(b) by 0 days.

(21) Appl. No.: 17/402,378

(22) Filed: Aug. 13, 2021

(65) Prior Publication Data

US 2023/0096233 A1    Mar. 30, 2023

(51) Int. Cl.
| H04L 29/06 | (2006.01) |
| H04L 9/32 | (2006.01) |
| H04L 9/06 | (2006.01) |
| H04L 9/08 | (2006.01) |

(52) U.S. Cl.
CPC .......... *H04L 9/3273* (2013.01); *H04L 9/0656* (2013.01); *H04L 9/085* (2013.01)

(58) Field of Classification Search
None
See application file for complete search history.

(56) References Cited

U.S. PATENT DOCUMENTS

| 7,571,320 | B2 * | 8/2009 | Davis | .................. H04L 9/3273 713/169 |
| D607,009 | S | 12/2009 | McEnaney | |
| D614,192 | S | 4/2010 | Takano | |
| 7,885,635 | B2 | 2/2011 | Laursen | |
| 7,925,013 | B1 * | 4/2011 | Washington | ............ G06F 21/78 380/278 |
| 7,992,102 | B1 | 8/2011 | De Angelo | |

(Continued)

FOREIGN PATENT DOCUMENTS

| CN | 106413128 B | 7/2020 |
| WO | 2016179433 A1 | 11/2016 |

OTHER PUBLICATIONS

Erdem Alkim et al., "Post-Quantum key exchange—a new hope", International Association For Cryptologic Research, vol. 20161116:063839, Nov. 16, 2016, pp. 1-22.

(Continued)

*Primary Examiner* — Maung T Lwin
(74) *Attorney, Agent, or Firm* — Haverstock & Owens, A Law Corporation

(57) ABSTRACT

Aspects and features of a cryptosystem and authentication for the cryptosystem, and a method or process for the cryptosystem, are described. In one example, a method for cryptographic communications includes storing a secret key, generating a system randomization number, and encrypting a plain data package into an encrypted data package by application of the plain data package, the secret key, and the system randomization number to a system of equations for encryption. The system of equations can be a system of linearly dependent equations in one example. Among other benefits, the cryptosystem relies upon the system of linearly dependent equations and the system randomization number to provide additional strength against known-plaintext attacks, chosen-plaintext attacks, and other types of attacks. The system is more semantically secure and offers ciphertext indistinguishability in a new approach using the system of linearly dependent equations.

33 Claims, 6 Drawing Sheets

(56) References Cited

U.S. PATENT DOCUMENTS

| | | | |
|---|---|---|---|
| 8,218,762 B2* | 7/2012 | Itoh | H04L 9/0631 |
| | | | 713/168 |
| 8,363,259 B2 | 1/2013 | Gilboa | |
| 8,417,642 B2 | 4/2013 | Oren | |
| 8,543,834 B1 | 9/2013 | Barra | |
| 8,543,884 B2 | 9/2013 | Mansour | |
| 8,621,209 B1 | 12/2013 | Johansson | |
| 8,639,785 B2 | 1/2014 | Kiley | |
| 8,892,871 B2 | 11/2014 | Cho | |
| D719,176 S | 12/2014 | Cohen | |
| D719,177 S | 12/2014 | Cohen | |
| D723,050 S | 2/2015 | Minsung et al. | |
| 9,112,835 B2 | 8/2015 | Isozaki | |
| 9,210,156 B1 | 12/2015 | Little | |
| 9,219,732 B2 | 12/2015 | Baghdasaryan | |
| 9,350,539 B2* | 5/2016 | Veugen | H04L 9/065 |
| 9,392,460 B1 | 7/2016 | Blake | |
| 9,419,951 B1 | 8/2016 | Felsher et al. | |
| D765,669 S | 9/2016 | Shaw | |
| 9,706,406 B1 | 7/2017 | Adams | |
| D800,764 S | 10/2017 | Thoreson | |
| 9,852,418 B2 | 12/2017 | Mardikar | |
| D813,884 S | 3/2018 | Penker | |
| 9,959,694 B2 | 5/2018 | LIndsay | |
| 9,961,547 B1 | 5/2018 | Molina-Markham | |
| 10,019,561 B1 | 7/2018 | Shelton | |
| 10,200,364 B1 | 2/2019 | Ketharaju et al. | |
| D847,857 S | 5/2019 | Elatta | |
| 10,402,800 B2 | 9/2019 | Lucas | |
| 10,437,975 B1 | 10/2019 | Shelton | |
| 10,521,223 B1 | 12/2019 | Bogushefsky, III | |
| 10,810,290 B2 | 10/2020 | Minter et al. | |
| 10,867,021 B1 | 12/2020 | Shelton | |
| 10,887,307 B1 | 1/2021 | Newstadt | |
| 10,911,425 B1 | 2/2021 | Hitchcock | |
| D916,890 S | 4/2021 | Nagpal | |
| 10,970,607 B2 | 4/2021 | Xue | |
| 11,005,839 B1 | 5/2021 | Shahidzadeh | |
| 11,030,618 B1 | 6/2021 | Budko | |
| 11,038,694 B1 | 6/2021 | Kleinman | |
| D925,602 S | 7/2021 | Xu | |
| D928,803 S | 8/2021 | Faller | |
| D928,820 S | 8/2021 | Bodduluri | |
| 11,121,878 B2 | 9/2021 | McCarty | |
| 2002/0099955 A1 | 7/2002 | Peled | |
| 2003/0016844 A1 | 1/2003 | Numaoka | |
| 2004/0223616 A1 | 11/2004 | Kocarev | |
| 2006/0031301 A1 | 9/2006 | Herz et al. | |
| 2006/0196950 A1 | 9/2006 | Kiliccote | |
| 2008/0031460 A1* | 2/2008 | Brookner | H04L 9/085 |
| | | | 380/282 |
| 2008/0301057 A1 | 12/2008 | Oren | |
| 2009/0194592 A1 | 8/2009 | Ming et al. | |
| 2009/0315671 A1 | 12/2009 | Gocho | |
| 2009/0327746 A1* | 12/2009 | Greco | H04L 9/083 |
| | | | 713/189 |
| 2010/0079591 A1 | 4/2010 | Lee | |
| 2011/0072142 A1 | 3/2011 | Herz et al. | |
| 2011/0167255 A1 | 7/2011 | Matzkel | |
| 2011/0187642 A1 | 8/2011 | Faith | |
| 2011/0233284 A1 | 9/2011 | Howard | |
| 2011/0302405 A1 | 12/2011 | Marlow | |
| 2012/0214442 A1 | 8/2012 | Crawford | |
| 2012/0221859 A1 | 8/2012 | Marien | |
| 2012/0272058 A1 | 10/2012 | Wang et al. | |
| 2012/0281885 A1 | 11/2012 | Syrdal | |
| 2013/0086625 A1 | 4/2013 | Driscoll | |
| 2013/0111208 A1 | 5/2013 | Sabin et al. | |
| 2013/0239191 A1 | 9/2013 | Bostick | |
| 2014/0039892 A1 | 2/2014 | Mills | |
| 2014/0040628 A1 | 2/2014 | Fort et al. | |
| 2014/0244514 A1 | 8/2014 | Rodriquez | |
| 2014/0244515 A1 | 8/2014 | Garfinkle | |
| 2014/0278077 A1 | 9/2014 | Levin | |
| 2014/0368601 A1 | 12/2014 | deCharms | |
| 2015/0089568 A1 | 3/2015 | Sprague | |
| 2015/0242601 A1 | 8/2015 | Griffiths | |
| 2015/0242605 A1 | 8/2015 | Du | |
| 2015/0271679 A1 | 9/2015 | Park | |
| 2015/0278805 A1 | 10/2015 | Spencer, III | |
| 2015/0294092 A1 | 10/2015 | Balasubramanian | |
| 2015/0347734 A1 | 12/2015 | Beigi | |
| 2015/0356289 A1 | 12/2015 | Brown | |
| 2015/0365229 A1* | 12/2015 | Patey | H04L 9/0869 |
| | | | 380/30 |
| 2015/0373007 A1 | 12/2015 | Sheller | |
| 2016/0011224 A1 | 1/2016 | Pollack | |
| 2016/0057623 A1 | 2/2016 | Dutt | |
| 2016/0065570 A1 | 3/2016 | Spencer | |
| 2016/0110528 A1 | 4/2016 | Gupta | |
| 2016/0135107 A1 | 5/2016 | Hampel | |
| 2016/0180078 A1 | 6/2016 | Chhabra | |
| 2016/0182503 A1 | 6/2016 | Cheng | |
| 2016/0227411 A1 | 8/2016 | Lundblade | |
| 2016/0239649 A1 | 8/2016 | Zhao | |
| 2016/0239657 A1 | 8/2016 | Loughlin-McHugh et al. | |
| 2016/0283406 A1 | 9/2016 | Linga | |
| 2016/0342873 A1 | 11/2016 | Winkk et al. | |
| 2017/0013453 A1 | 1/2017 | Lee | |
| 2017/0041309 A1 | 2/2017 | Ekambaram et al. | |
| 2017/0063528 A1 | 3/2017 | Seo | |
| 2017/0070890 A1 | 3/2017 | Luff | |
| 2017/0085382 A1* | 3/2017 | Kamakari | H04L 9/304 |
| 2017/0124385 A1 | 5/2017 | Ganong | |
| 2017/0193211 A1 | 7/2017 | Blake | |
| 2017/0272419 A1 | 9/2017 | Kumar | |
| 2017/0289168 A1 | 10/2017 | Bar | |
| 2017/0339118 A1 | 11/2017 | Hwang | |
| 2018/0005239 A1 | 1/2018 | Schlesinger | |
| 2018/0012003 A1 | 1/2018 | Asulin | |
| 2018/0025135 A1 | 1/2018 | Odom | |
| 2018/0029560 A1 | 2/2018 | Mohaupt | |
| 2018/0039990 A1 | 2/2018 | Lindemann | |
| 2018/0114221 A1 | 4/2018 | Karantzis | |
| 2018/0135815 A1 | 5/2018 | Rowles | |
| 2018/0167816 A1 | 6/2018 | Kusens et al. | |
| 2018/0248865 A1 | 8/2018 | Johansson | |
| 2018/0285879 A1 | 10/2018 | Gadnis | |
| 2018/0302416 A1 | 10/2018 | Einberg | |
| 2018/0329857 A1 | 11/2018 | Ko | |
| 2018/0375848 A1 | 12/2018 | Tunnell | |
| 2019/0122024 A1 | 4/2019 | Schwartz | |
| 2019/0207918 A1 | 7/2019 | Kurian | |
| 2019/0268774 A1 | 8/2019 | Kusens et al. | |
| 2019/0281025 A1 | 9/2019 | Harriman | |
| 2019/0281036 A1 | 9/2019 | Eisen | |
| 2019/0318122 A1 | 10/2019 | Hockey | |
| 2019/0342092 A1 | 11/2019 | Handschuh | |
| 2020/0042723 A1 | 2/2020 | Krishnamoorthy | |
| 2020/0050745 A1 | 2/2020 | Kim | |
| 2020/0053096 A1 | 2/2020 | Bendersky | |
| 2020/0066071 A1 | 2/2020 | Budman | |
| 2020/0097643 A1 | 3/2020 | Uzun | |
| 2020/0125704 A1 | 4/2020 | Chavez | |
| 2020/0162435 A1 | 5/2020 | Kubo | |
| 2020/0175157 A1 | 6/2020 | Wilding | |
| 2020/0193051 A1 | 6/2020 | Van Antwerp | |
| 2020/0358787 A1 | 11/2020 | Barker | |
| 2020/0403787 A1 | 12/2020 | Islam | |
| 2020/0403992 A1 | 12/2020 | Huffman | |
| 2021/0014314 A1 | 1/2021 | Yamada | |
| 2021/0123835 A1 | 4/2021 | Glennon | |
| 2021/0250759 A1 | 8/2021 | Ziv | |
| 2022/0108026 A1 | 4/2022 | Ortiz et al. | |

OTHER PUBLICATIONS

Joppe W. Bos et al., "Post-quantum key exchange for the TLS protocol from the ring learning with errors problem", International Association for Cryptologic Research, vol. 20150316:235249, Mar. 17, 2015, pp. 1-28.

International Search Report dated Aug. 11, 2016, for PCT Application No. PCT/US2016/031055, filed May 5, 2016, five pages.

(56) References Cited

OTHER PUBLICATIONS

International Search Report dated Oct. 9, 2019, for PCT Application No. PCT/US2019/041871, filed Jul. 15, 2019, four pages.
Li et al., "Addressable Metasurfaces for Dynamic Holography and Optical Information Encryption", Jun. 15, 2018, http://advances.sciencemag.org/content/advances/4/6/eaar6768.full.pdf.
The International Search Report and Written Report for the International Application No. PCT/US2020/064099 dated Mar. 16, 2021.
Magoon, Owais, "iOS app." Behance, published Sep. 7, 2015 (Retrieved from the Internet Mar. 22, 2021). Internet URL: <https://www.behance.net/gallery/27383661/iOS-app> (Year: 2015).
Bywater Films, "Winkk: Emotion to Action." Vimeo, published Oct. 7, 2015 (Retrieved from the Internet Mar. 22, 2021). Internet URL: <https://vimeo.com/141695923> (Year: 2015).
Schiff, Eli, "Unofficial Apple Icon Design Awards." Eli Schiff Blog, published Jan. 5, 2016 (Retrieved from the Internet Mar. 22, 2021), Internet URL: <www.elischiff.com/blog/2016/1/5/apple-icon-design-awards> (Year: 2016).
International Report on Patentability from International Application No. PCT/US2020/064099, dated Jun. 23, 2022, 7 pages.

* cited by examiner

CHOSEN-PLAINTEXT SECURE CRYPTOSYSTEM AND AUTHENTICATION

BACKGROUND

Cryptography is related to the study of protocols, techniques, and approaches that prevent third parties from accessing, reading, and/or interpreting secret data. Cryptography can be applied to various processes in information security, such as data integrity and encryption, confidentiality, authentication, verification, and non-repudiation. Thus, cryptography has several applications in various fields, including computer network data encryption and privacy, transaction processing, and computing system security and integrity.

Modern cryptography often relies upon computational hardness in mathematical theory. In other words, it might be theoretically possible to break certain cryptographic systems, but the time required to do so makes such cryptographic-defeating processes intractable. Computationally-secure cryptography processes are preferable to those which are easier to defeat. At the same time, however, computationally-secure cryptography processes might be more computationally-intensive to implement and, thus, more time consuming and costly.

Thus, although some cryptographic processes, such as a one-time pad, cannot be broken or defeated even with unlimited computing power, those schemes are more difficult to implement than a good, theoretically-breakable but computationally-secure approach. As such, today's modern computing devices settle for a pragmatic compromise. Modern computing devices exchange secret data using cryptographic processes that are relatively resource intensive (e.g., the processes are computationally-intensive and difficult to defeat) but still have security limitations (e.g., the processes are still susceptible to brute force attacks).

SUMMARY

Aspects and features of a cryptosystem and authentication for the cryptosystem, and a method or process for the cryptosystem, are described. In one example, a method for cryptographic communications includes storing a secret key, generating a system randomization number, and encrypting a plain data package into an encrypted data package by application of the plain data package, the secret key, and the system randomization number to a system of equations for encryption. The system of equations can be a system of linearly dependent equations in one example. Among other benefits, the cryptosystem relies upon the system of linearly dependent equations and the system randomization number to provide additional strength against known-plaintext attacks, chosen-plaintext attacks, and other types of attacks. The system is more semantically secure and offers ciphertext indistinguishability in a new approach using the system of linearly dependent equations.

In other aspects of the embodiments, the secret key includes a set of secret key packages, the randomization number comprises a set of random number packages, and encrypting the plain data package comprises applying the plain data package, the set of secret key packages, and the set of random number packages to the system of equations for encryption.

The method can also include dividing plain data comprising the plain data package into a set of plain data packages for encryption, dividing the secret key into a set of secret key packages, and dividing the randomization number into a set of random numbers. The method can also include encrypting the set of plain data packages into sets of encrypted data packages by applying the set of plain data packages, the secret key packages, and the set of random numbers to the system of equations for encryption.

In one example, x is the plain data package, the secret key comprises a set of secret key packages $k_1$, $k_2$, and $k_3$, the randomization number comprises a set of random number packages $r_1$ and $r_2$, and the system of equations for encryption includes:

$(k_1+r_1) \oplus k_2 = m_1$, $(x+r_2) \oplus k_3 = m_2$, and $r_1+r_2 = m_3$, where the encrypted data package comprises $m_1$, $m_2$, $m_3$.

In another example, x is the plain data package, the secret key comprises a set of secret key packages $k_1$, $k_2$, $k_3$, $k_4$, $k_5$, $k_6$, $k_7$, $k_8$, and $k_9$, the randomization number comprises a set of random number packages $r_1$, $r_2$, $r_3$, and $r_4$, and the system of equations for encryption includes:

$(k_1+r_1+r_3) \oplus k_2+k_4 = m_1$, $(x+r_2+r_4) \oplus k_3+k_5 = m_2$, $(r_1+r_2) \oplus k_6+k_7 = m_3$, and $(r_3+r_4) \oplus k_8+k_9 = m_4$, where the encrypted data package comprises $m_1$, $m_2$, $m_3$, and $m_4$.

In other aspects, the method can further include decrypting, by the second computing device, the encrypted data package to the plain data package, by application of the encrypted data package and the secret key to an equation for decryption. In one example of this case, x is the plain data package, the encrypted data package comprises $m_1$, $m_2$, and $m_3$, the secret key comprises a set of secret key packages $k_1$, $k_2$, and $k_3$, and the equation for decryption is: $x = m_1 \oplus k_2 + m_2 \oplus k_3 - k_1 - m_3$.

In another example for decrypting, x is the plain data package, the encrypted data package comprises the numbers $m_1$, $m_2$, $m_3$, and $m_4$, the secret key comprises a set of secret key packages $k_1$, $k_2$, $k_3$, $k_4$, $k_5$, $k_6$, $k_7$, $k_8$, and $k_9$, and the equation for decryption is:

$x = (m_1 - k_4) \oplus k_2 + (m_2 - k_5) \oplus k_3 - (m_3 - k_7) \oplus k_6 - (m_4 - k_9) \oplus k_8 - k_1$.

In another embodiment, a computing device for cryptographic communications includes a memory device configured to store computer-readable instructions thereon and a processing device configured, through execution of the computer-readable instructions, to generate a randomization number, encrypt a plain data package into an encrypted data package by application of the plain data package, a secret key, and the randomization number to a system of equations for encryption, and communicate the encrypted data package to a second computing device. In one case, the system of equations includes a system of linearly dependent equations.

In another aspect, the secret key includes a set of secret key packages, the randomization number comprises a set of random number packages, and the processing device is further configured to apply the plain data package, the set of secret key packages, and the set of random number packages to the system of equations for encryption.

The processing device can also be configured to divide plain data comprising the plain data package into a set of plain data packages for encryption, divide the secret key into a set of secret key packages, and divide the randomization number into a set of random numbers. In this case, the processing device is further configured to encrypt the set of plain data packages into sets of encrypted data packages by applying the set of plain data packages, the secret key packages, and the set of random numbers to the system of equations for encryption.

In another embodiment, a computing device for cryptographic communications includes a memory device configured to store computer-readable instructions thereon, and a processing device configured, through execution of the computer-readable instructions, to decrypt an encrypted data package to a plain data package, by application of the encrypted data package and a secret key to an equation for decryption, wherein x is the plain data package, the encrypted data package comprises $m_1$, $m_2$, and $m_3$, the secret key comprises a set of secret key packages $k_1$, $k_2$, and $k_3$, and the equation for decryption is: $x = m_1 \oplus k_2 + m_2 \oplus k_3 - k_1 - m_3$.

In another embodiment, a computing device for cryptographic communications includes a memory device configured to store computer-readable instructions thereon, and a processing device configured, through execution of the computer-readable instructions, to decrypt an encrypted data package to a plain data package, by application of the encrypted data package and a secret key to an equation for decryption, wherein x is the plain data package, the encrypted data package comprises $m_1$, $m_2$, $m_3$, and $m_4$, the secret key comprises a set of secret key packages $k_1$, $k_2$, $k_3$, $k_4$, $k_5$, $k_6$, $k_7$, $k_8$, and $k_9$, and the equation for decryption is: $x = (m_1 - k_4) \oplus k_2 + (m_2 - k_5) \oplus k_3 - (m_3 - k_7) \oplus k_6 - (m_4 - k_9) \oplus k_8 - k_1$.

Another embodiment includes a non-transitory computer readable medium storing computer-readable instructions thereon that, when executed by a processing device, direct the processing device to generate a randomization number, encrypt a plain data package into an encrypted data package by application of the plain data package, a secret key, and the randomization number to a system of equations for encryption, and communicate the encrypted data package to a second computing device. The system of equations can include a system of linearly dependent equations.

Another embodiment includes a method for cryptographic authentication, including registering a first computing device with an authentication system, registering a second computing device with the authentication system, obtaining, by the authentication system, a first authentication credential from the first computing device, obtaining, by the authentication system, a second authentication credential from the second computing device, and operating, by the authentication system, on the first authentication credential and on the second authentication credential, to generate a combined credential for the first computing device and the second computing device. The method can also include receiving, by the authentication system, an identity credential from the first computing device, generating a verification credential for the second computing device based on the identity credential and the combined credential, and communicating the verification credential to the second computing device.

Another embodiment includes a method for cryptographic communications with authentication, including generating an identity number, combining plain data with the identity number, to generate identified data, encrypting, by a first computing device, the identified data into an encrypted data package by application of the identified data, a secret key, and a randomization number to a system of equations for encryption, and communicating the encrypted data package to a second computing device. The method can also include preparing, by the first computing device, an identity credential based on a combination of an authentication identifier of the first computing device and the identity number, and communicating, by the first computing device, the identity credential to an authentication system.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
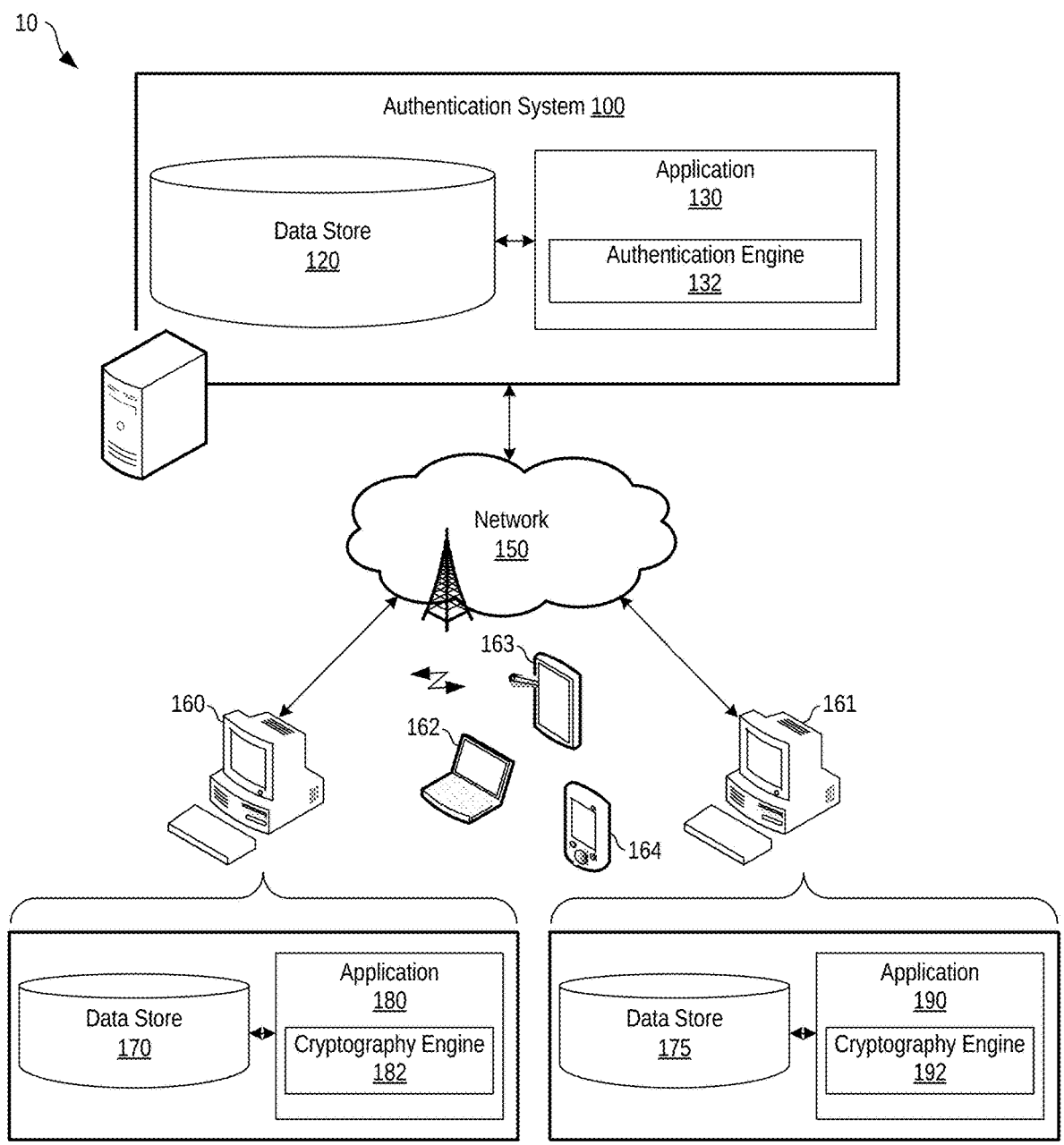
FIG. 1 illustrates an example networked environment for encryption according to various examples described herein.

As noted above, cryptography is related to the study of protocols, techniques, and approaches that prevent third parties from accessing, reading, and/or interpreting the communication of secret data between parties. Among others, asymmetric key algorithms and symmetric key algorithms are two well-known approaches in cryptography.

Public-key or asymmetric key algorithms rely upon public/private key pairs. The public key can be distributed widely, and the private key is held by one user or party as a secret. Security in an asymmetric cryptography system relies upon maintaining the privacy of the private key, but the public key can be distributed without compromising security. Asymmetric cryptosystems are based on complexity but can, theoretically, be cracked, broken, and decrypted. For example, the Rivest-Shamir-Adleman (RSA) cryptosystem, the elliptic curve cryptography (ECC) cryptosystem, and other asymmetric (and even some symmetric) methods of secure key exchange can be cracked.

Symmetric key algorithms rely upon a single key for both encryption and decryption processes. Symmetric key algorithms are generally more complex, secure, and difficult to break than asymmetric key algorithms. Some symmetric key algorithms are considered virtually unbreakable, even using quantum computing devices. In terms of processing demands, symmetric key algorithms are also relatively less demanding and, thus, faster and cheaper to implement. Symmetric key algorithms are often used for the encryption and decryption of significant amounts of data where strong cryptography is desired. There are many different symmetric key algorithms, such as the data encryption standard (DES), advanced encryption standard (AES), international data encryption algorithm (IDEA), and the RC4 and RC5 stream cipher algorithms, among others.

However, like asymmetric cryptosystems, symmetric cryptosystems can also be subject to attack and, in some cases, broken and decrypted. Various weaknesses of asymmetric and symmetric cryptosystems are known in the field. Known-plaintext and chosen-plaintext attacks, among other approaches, can be used by attackers to evaluate weaknesses in and defeat cryptosystems. In a known-plaintext or chosen-plaintext attack, the attacker either a priori knows—or even choses—the blocks of plaintext data corresponding to the encrypted cyphertext blocks. The cyphertext blocks can then be analyzed in connection with the plaintext blocks, in an attempt to determine the cryptographic key or other operational aspects of the cryptosystem, which can then be used to further attack the cryptosystems or even decrypt other messages.

The embodiments described herein are directed to aspects and features of a new cryptosystem. The cryptosystem provides certain improvements as compared to conventional techniques. In one aspect, the cryptosystem relies upon a system of linearly dependent equations and a system randomization number to provide additional strength against known-plaintext attacks, chosen-plaintext attacks, and other types of attacks. The system is more semantically secure and offers ciphertext indistinguishability in a new approach using the system of linearly dependent equations, randomization numbers, authentication numbers, and other aspects. The system is also suitable for use with identity authentication techniques, and a centralized authentication system and processes performed by the authentication system are also described herein.

In one example, a method for cryptographic communications includes storing a secret key, generating a system randomization number, and encrypting a plain data package into an encrypted data package by application of the plain data package, the secret key, and the system randomization number to a system of equations for encryption. The system of equations can be a system of linearly dependent equations in one example. Among other benefits, the cryptosystem relies upon the system of linearly dependent equations and the system randomization number to provide additional strength against known-plaintext attacks, chosen-plaintext attacks, and other types of attacks. The system is more semantically secure and offers ciphertext indistinguishability in a new approach using the system of linearly dependent equations. Additional features and benefits of the embodiments are described in further detail below.

Turning to the drawings, FIG. 1 illustrates an example networked environment 10 for encryption according to various examples described herein. The networked environment 10 includes an authentication system 100, a network 150, and a number of computing devices 160-164 communicatively coupled to each other (and to the authentication system 100) over the network 150. The networked environment 10 is provided as a representative example of a system in which computing devices are capable of communicating data among each other. As described below, the authentication system 100 and the computing devices 160-164 can securely communicate data between each other using the cryptographic operations described herein. However, the cryptographic concepts described herein can be applied to other networked computing environments, systems, and devices.

The authentication system 100 can be embodied as one or more computing environments, computer systems, computing devices, or processing systems or devices. The authentication system 100 can include one or more computing devices arranged, for example, in one or more server or computer banks. The computing device or devices can be located at a single installation site or distributed among different geographical locations. The authentication system 100 can include a plurality of computing devices that together embody a hosted computing resource, a grid computing resource, or other distributed computing arrangement. In some cases, the authentication system 100 can be embodied as an elastic computing resource where an allotted capacity of processing, network, storage, or other computing-related resources varies over time. As further described below, the authentication system 100 can also be embodied, in part, as certain functional or logical (e.g., computer-readable instruction) elements or modules. Those elements can be executed to direct the authentication system 100 to act as an authentication or identity-verification system in the networked environment 10, as described in further detail below.

As also shown in FIG. 1, the authentication system 100 includes a data store 120 and an application 130. The data store 120 can be embodied as a memory, of any suitable type, and can be used to store data and data files, including sensitive or secret data, executable code, and other information. The application 130 is an example of one application program executable on the authentication system 100. The authentication system 100 can host and execute any number of applications concurrently, as would be understood in the field of computing. As shown in FIG. 1, the application 130 includes an authentication engine 132. The operation of the authentication system 100, including the application 130 and the authentication engine 132, is described in greater detail below.

The network 150 can include the Internet, intranets, extranets, wide area networks (WANs), local area networks (LANs), wired networks, wireless networks, cable networks, satellite networks, other suitable networks, or any combinations thereof. As one example, the authentication system 100 and the computing devices 160-164 can be respectively coupled to one or more public or private LANs or WANs and, in turn, to the Internet for communication of data among each other. Although not shown in FIG. 1, the network 150 can also include communicative connections to any number and type of network hosts or devices, such as website servers, file servers, cloud computing resources, databases, data stores, or any other network or computing architectures.

In the networked environment 10, the authentication system 100 and the computing devices 160-164 can communicate data among each other using one or more network transfer protocols or interconnect frameworks, such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), other protocols and interconnect frameworks, and combinations thereof.

As noted above, the authentication system 100 and the computing devices 160-164 can communicate data between each other over the network 150. The data can be sensitive in many cases, such as when account numbers, passwords, identifying information (e.g., full names, addresses, social security numbers, etc.), and other sensitive data is communicated. In that context, the cryptographic concepts and processes described herein can be relied upon to securely share secret data between and among the authentication system 100 and the computing devices 160-164 over the network 150.

The computing devices 160-164 are representative of various types of computing devices, processing devices, and/or processor-based device or systems, including those in the form of a server computer, desktop computer, a laptop computer, a tablet computer, a personal digital assistant, a cellular telephone, a wearable computing device, a set-top box, and other example computing devices and systems. Each of the computing devices 160-164 can include one or more processors or processing devices, cryptographic trusted platform modules (TPMs), memory devices, local interfaces, various peripheral devices, and other components. The peripheral devices can include input or communications devices or modules, such as keyboards, keypads, touch pads, touch screens, microphones, cameras, network communications interfaces, wireless network communications modules (e.g., infra-red, WI-FI®, or BLUETOOTH®), buttons, switches, sensors, etc. The peripheral devices can also include a display, indicator lights, speakers, global positioning system (GPS) circuitry, accelerometers, gyroscopes, and other peripheral devices.

As shown in FIG. 1, the computing device 160 includes a data store 170 and an application 180. The data store 170 can be embodied as any suitable type of memory and can be used to store data and data files, including sensitive or secret data in plaintext or ciphertext forms, random numbers, executable code, and other information. In some cases, the data store 170 includes, at least in part, the memory of a TPM.

The application 180 is an example of one application program executable on the computing device 160. The computing device 160 can host and execute any number of applications concurrently, as would be understood in the field of computing. As one example, the application 180 can be embodied as a hypertext-based network browser, such as the Internet Explorer®, Firefox®, Chrome®, Safari®, or Silk® browsers, among other types of browsers. Additionally or alternatively, the application 180 can be embodied as an e-mail client, messaging client, or other application(s) for other purpose(s). In any case, when executed on the computing device 160, the application 180 can receive user input and data, process data, interpret and render various interfaces on display devices, and conduct other processes and tasks. As shown in FIG. 1, the application 180 includes a cryptography engine 182 (also, "first engine 182"), among other application submodules, and the operations of the cryptography engine 182 are described in additional detail below.

The computing device 161 includes a data store 175 and an application 190. The data store 175 can be embodied as any suitable type of memory and can be used to store data and data files, including sensitive or secret data, executable code, and other information. The application 190 is an example of one application program executable on the computing device 161. The computing device 161 can host and execute any number of applications concurrently, as would be understood in the field of computing. As one example, the application 190 can be embodied as a hypertext-based network browser, such as the Internet Explorer®, Firefox®, Chrome®, Safari®, or Silk® browsers, among other types of browsers. Additionally or alternatively, the application 190 can be embodied as an e-mail client, messaging client, or other application(s) for other purpose(s). In any case, when executed on the computing device 161, the application 190 can receive user input and data, process data, interpret and render various interfaces on display devices, and conduct other processes and tasks. As shown in FIG. 1, the application 190 includes a cryptography engine 192 (also, "second engine 192"), among other application submodules, and the operations of the cryptography engine 192 are described in additional detail below.

Figure 2:
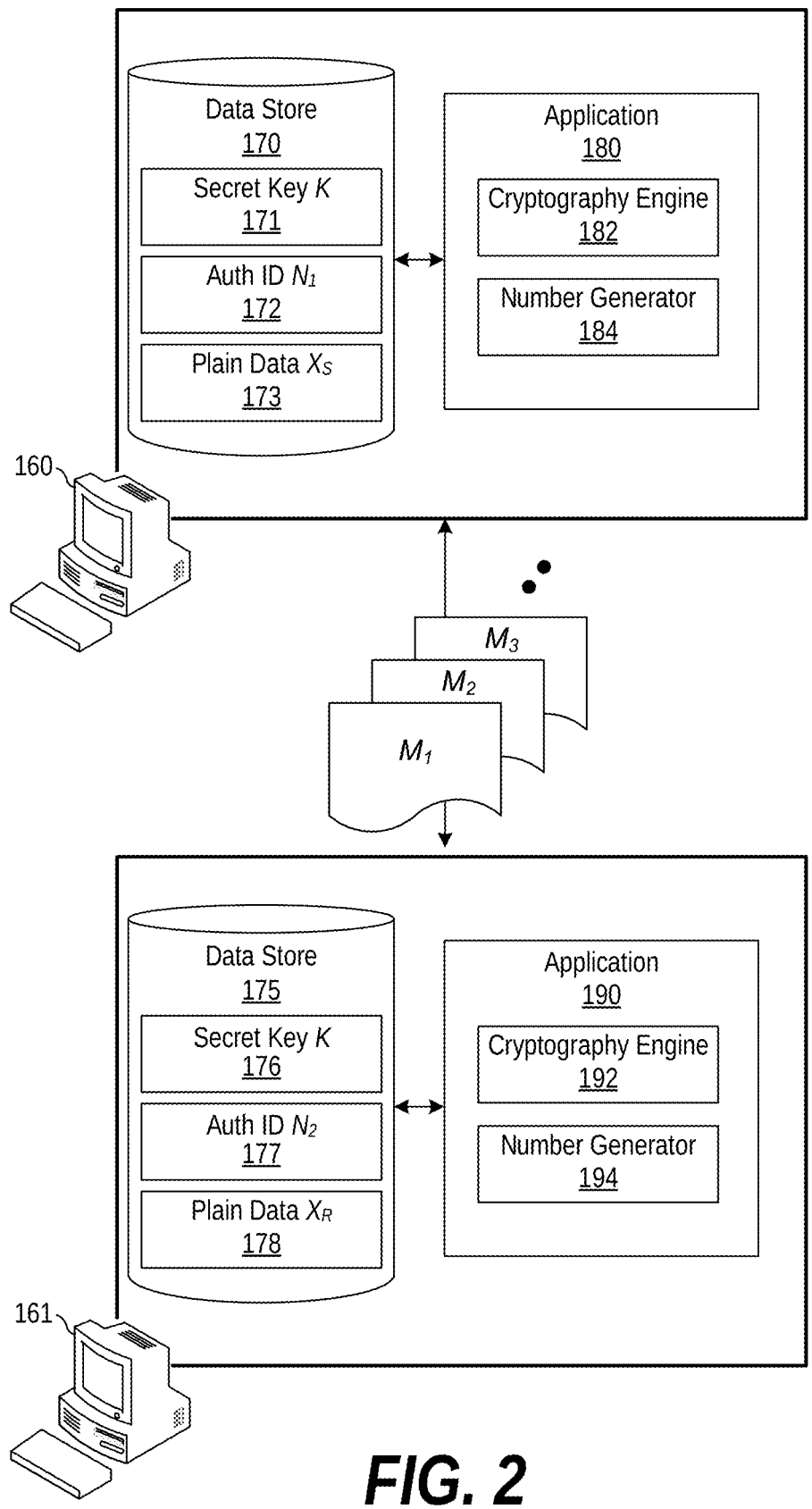
FIG. 2 illustrates an example implementation of the encryption techniques according to the embodiments described herein.

FIG. 2 illustrates an example implementation of the encryption techniques according to the embodiments described herein. FIG. 2 is provided as an example of the secure communication of data between the computing device 160 and the computing device 161, but the techniques can be applied for secure communication among any of the devices and systems shown in FIG. 1, among others. As shown in FIG. 2, the data store 170 of the computing device 160 stores the secret key K 171 (also "secret key 171"), the authentication identifier $N_1$ 172 (also "authentication identifier 172" and "Auth ID $N_1$ 172"), and the plain data $X_S$ 173 (also "plain data 173"), among potentially other data. Additionally, the application 180 of the computing device 160 includes the number generator 184. In some cases, the number generator 184 may be separate from the application 180. For example, the number generator 184 can be contained within a TPM of the computing device 160.

As also shown in FIG. 2, the data store 175 of the computing device 161 stores the secret key K 176 (also "secret key 176"), the authentication identifier $N_2$ 177 (also "authentication identifier 177" and "Auth ID $N_2$ 177"), and the plain data $X_R$ 178 (also "plain data 178"), among potentially other data. Additionally, the application 190 of the computing device 191 includes the number generator 194. In some cases, the number generator 194 may be separate from the application 190. For example, the number generator 194 can be contained within a TPM of the computing device 161.

The secret keys 171 and 176 can be a key for cryptographic operations, stored respectively by the computing devices 160 and 161. As one example, the secret keys 171 and 176 can be the same, common key K. The key K can be identical at both the computing devices 160 and 161, or a relatively simple transformation can exist between the secret key 171 and the secret key 176. In one example, the key K can be a symmetric key, and it can be generated by a TPM of either of the computing devices 160 and 161 and shared between the computing devices 160 and 161 using asymmetric keys, during an authentication process between the computing devices 160 and 161, with the authentication system 100, or in another way using other suitable techniques. However, the key K can be generated and exchanged in other suitable ways.

The authentication identifiers 172 and 177 can be unique identifiers of the computing devices 160 and 161, respectively. As described below with reference to FIG. 4, the authentication identifiers 172 and 177 can be generated as part of an authentication process performed between the computing devices 160 and 161 and the authentication system 100, but the authentication identifiers 172 and 177 are not needed or relied upon in all cases. That is, some of the cryptographic processes described herein do not rely upon the authentication identifiers 172 and 177. Thus, it is not necessary that the computing devices 160 and 161 store or rely upon the authentication identifiers 172 and 177 in all cases.

The plain data 173 and 178 can be any unencrypted data stored by the computing devices 160 and 161, respectively, for secure communication between the computing devices 160 and 161. The plain data 173 and 178 may be referred to as "plaintext," for example, data in the field of cryptography.

The plain data 173 and 178 can be organized in any suitable way, and the computing devices 160 and 161 can process the plain data 173 and 178 in any suitable chunks, such as blocks of bits of any size. Although several examples are provided of the secure communication of the plain data 173 from the computing device 160 to the computing device 161, the computing device 161 can also securely communicate the plain data 178 to the computing device 160.

The cryptography engine 182 of the computing device 160 is configured to perform a number of different operations that facilitate secure communications. Similarly, the cryptography engine 192 of the computing device 161 is configured to perform a number of different operations that facilitate secure communications. The operations of the cryptography engines 182 and 192 are described in further detail below.

The cryptography engines 182 and 192 can rely, in part, on the generation of random numbers for certain cryptographic operations. Thus, the number generators 184 and 194 of the computing devices 160 and 161 can be embodied as random number generators, respectively, for the cryptography engines 182 and 192. Each of the number generators 184 and 194 can be configured to generate a number of different random numbers, over time. The random numbers can be generated in any suitable bit length, uniformly distributed in bit values in a string of bits, uniformly distributed as compared to each other, and carry other attributes. The cryptography engines 182 and 192 can request and obtain random numbers from the number generators 184 and 194 at any time in the cryptographic processes described herein. Random numbers generated by the number generators 184 and 194 can be relied upon to provide semantic security, ciphertext indistinguishability, protect or obscure the secret keys 171 and 176, protect or obscure the authentication identifiers 172 and 177, protect the integrity of the cryptographic operations performed by the computing devices 160 and 161, and add other benefits to the embodiments.

Turning to an operational example, the computing device 160 can securely communicate the plain data 173 to the computing device 161 over the network 150. Before communicating the plain data 173, the cryptography engine 182 can encrypt the plain data 173 using a system of equations for encryption, the secret key K 171, and a randomization number R generated by the number generator 184. In one example, the system of equations can be a system of linearly dependent equations. The system of equations can include three equations and rely upon three random number packages as described in further detail below. In another example, the system of equations can include four equations and rely upon four random number packages. However, the system of equations is not limited to any particular size or complexity, and other, larger systems can be relied upon. For decryption, the cryptography engine 192 of the computing device 161 can rely upon a system of equations for decryption, which is also described in further detail below.

The cryptography engine 182 can be configured to format, divide, or segment the plain data 173, the randomization number R, the secret key K 171, and possibly other data, into segmented data chunks or packages suitable for operation using the system of equations. To that end, the cryptography engine 182 is configured to divide or separate the plain data $X_S$ 173 into segmented plain data packages $x_i$, as follows:

$$X_S=\{x_1, x_2, \ldots, x_m\}. \tag{1}$$

Each of the segmented plain data packages $x_i$ can be two bytes in length in one example, although the size of each $x_i$, in bits, can vary based on the type(s) of processors used in the computing devices 160 and 161, among other factors. Example bit sizes for each segmented plain data package $x_i$ are described in detail below. The number of plain data packages $x_i$, on the other hand, depends on the amount of data to be securely communicated.

The cryptography engine 182 is also configured to divide or segment the secret key K 171 into segmented secret key packages $k_i$, as follows:

$$K=\{k_i\}_{i=1}^n. \tag{2}$$

Each of the segmented secret key packages $k_i$ can be two bytes in length in one example, although the size of each $k_i$ can vary based on the type(s) of processors used in the computing devices 160 and 161, among other factors. Example bit sizes for the secret key packages $k_i$ are described in detail below.

As also described below, when using a system of three equations (e.g., the Equations (4)), the cryptography engine 182 of the computing device 160 can operate with three (3) segmented secret key packages $k_1$, $k_2$, and $k_3$ for each data package $x_i$. When using a system of four equations (e.g., the Equations (5)), the cryptography engine 182 can operate with nine (9) segmented secret key packages $k_1$-$k_9$ for each data package $x_i$, and other numbers of secret key packages can be relied upon for other systems of linear equations. The full size of the secret key K 171 in bits, before being segmented, can thus depend on a number of factors, including the type(s) of processors used in the computing devices 160 and 161, the system of equations used, and other factors. Both the computing device 160 and the computing device 161 share (i.e., know and store) the same secret key K. That is, the secret key K 171, which is stored by the computing device 160, and the secret key K 176, which is stored by the computing device 161, are the same secret key K, and the computing devices 160 and 161 can exchange the secret key K with each other in any suitable way.

The cryptography engine 182 can also direct the number generator 184 to generate a random number R, and the random number R can serve as a randomization number. The random number R can be a uniformly distributed random number in one example. The cryptography engine 182 is also configured to divide or segment the random number R into a set of random number packages $r_l$, as follows:

$$R=\{r_l\}_{l=1}^p. \tag{3}$$

Each $r_l$ can also be two bytes in length in one example, although the size can vary based on the type(s) of processors used in the computing devices 160 and 161, among other factors. Example bit sizes for each random number package $r_l$ are described in detail below. As also described below, when using a system of three equations, the cryptography engine 182 of the computing device 160 can operate with a set of two (2) random number packages $r_1$ and $r_2$ for each data package $x_i$. When using a system of four equations, the cryptography engine 182 can operate with a set of four (4) random number packages $r_1$-$r_4$ for each data package $x_i$. The full size of the random or randomization number R in bits, before being segmented, can thus depend on a number of factors, including the type(s) of processors used in the computing devices 160 and 161, the system of equations used, and other factors.

The plain data packages $x_i$, the secret key packages $k_i$, and the random number packages $r_l$ can be stored in the data store 170, as needed, for further processing by the cryptography engine 182. The cryptography engine 182 is also configured to apply or process the plain data packages $x_i$, the secret key packages $k_i$, and the random number packages $r_i$ to the system of equations for encryption. For the three equation system, one example of the system of equations ("Equations (4)") is as follows:

$$(k_1+r_1) \oplus k_2 = m_1,$$

$$(x_i+r_2) \oplus k_3 = m_2, \text{ and}$$

$$r_1+r_2 = m_3, \text{ where} \qquad (4)$$

$\oplus$ is logical XOR and $m_1$, $m_2$, and $m_3$ are parts or segments of an encrypted data package $M_i$. The values of $m_1$, $m_2$, and $m_3$ can be concatenated or strung together as a single encrypted data package $M_i$, which corresponding to the plain data package $x_i$ (i.e., $M_i$ is the ciphertext of the $x_i$ plaintext). The computing device 160 can securely communicate the encrypted bit package $M_i$ to the computing device 161 over the network 150.

After processing the plain data package $x_1$ to obtain the encrypted data package $M_1$, the cryptography engine 182 can process subsequent plain data packages $x_2$, $x_3$, ... $x_m$, in turn, using the system of Equations (4), to generate the encrypted data packages $M_2$, $M_3$, ... $M_m$. In one case, the cryptography engine 182 can process the next plain data package $x_2$, among others, with the same secret key packages $k_1$, $k_2$, and $k_3$ and the same random numbers $r_1$ and $r_2$ as used for the plain data package $x_1$. In another example, the cryptography engine 182 is configured to process each respective plain data package $x_i$ with the same set of secret key packages $k_1$, $k_2$, and $k_3$ but with a different set of random numbers from the number generator 184. The use of a different set of random numbers for each plain data package $x_i$ can provide better semantic security and ciphertext indistinguishability. In still other examples, the cryptography engine 182 can process each respective plain data package x, with a different set of secret key packages, with a different set of random numbers, or with both a different set of secret key packages and a different set of random numbers. In any case, each of the encrypted data packages $M_1$, $M_2$, $M_3$, ... $M_m$ can be communicated from the computing device 160 to the computing device 161, as shown in FIG. 2.

For the four equation system, one example of the system of equations ("Equations (5)") is as follows:

$$(k_1+r_1+r_3) \oplus k_2 + k_4 = m_1,$$

$$(x_i+r_2+r_4) \oplus k_3 + k_5 = m_2,$$

$$(r_1+r_2) \oplus k_6 + k_7 = m_3, \text{ and}$$

$$(r_3+r_4) \oplus k_8 + k_9 = m_4, \text{ where} \qquad (5)$$

$\oplus$ is logical XOR and $m_1$, $m_2$, $m_3$, and $m_4$ are parts or segments of an encrypted data package M. The values of and $m_1$, $m_2$, $m_3$, and $m_4$ can be concatenated or strung together as the encrypted data package $M_i$ corresponding to the plain data package $x_i$, and the computing device 160 can securely communicate the encrypted data package $M_i$ to the computing device 161 over the network 150.

After the plain data package $x_1$, the cryptography engine 182 can process subsequent plain data packages $x_1$, $x_2$, $x_3$, ... $x_m$, in turn, using the system of Equations (5), to generate the encrypted data packages $M_1$, $M_2$, $M_3$, ... $M_m$. In one case, the cryptography engine 182 can process the next plain data package $x_2$, among others, with the same secret key packages $k_1$-$k_9$ and the same random numbers $r_1$-$r_4$ as used for the plain data package $x_1$. In another example, the cryptography engine 182 is configured to process each respective plain data package $x_i$ with the same secret key packages $k_1$-$k_9$ but with a different set of random numbers from the number generator 184. The use of a different set of random numbers for each plain data package $x_i$ can provide better semantic security and ciphertext indistinguishability. In still other examples, the cryptography engine 182 can process each respective plain data package x, with a different set of secret key packages, with a different set of random numbers, or with both a different set of secret key packages and a different set of random numbers. In any case, each of the encrypted data packages $M_1$, $M_2$, $M_3$, ... $M_m$ can be communicated from the computing device 160 to the computing device 161, as shown in FIG. 2.

The computing device 161 is configured to receive the encrypted data packages $M_2$, $M_3$, ... $M_m$ from the computing device 160. The encrypted data packages $M_1$, $M_2$, $M_3$, ... $M_m$ can be stored in the data store 175 for further processing by the application 190. The cryptography engine 192 is configured to decrypt the encrypted data packages $M_1$, $M_2$, $M_3$, ... $M_m$, respectively, to recapture the plain data $X_S$ 173 communicated from the computing device 160.

First, the cryptography engine 192 is configured to segment or divide each of the encrypted data packages $M_m$ into segmented encrypted data packages and $m_1$, $m_2$, and $m_3$. The cryptography engine 192 is also configured to segment or divide the secret key K 176 into segmented secret key packages $k_i$, similar to Equation (2) above. The cryptography engine 192 is also configured to decrypt the segmented encrypted data packages and $m_1$, $m_2$, and $m_3$ into a plain data package $x_i$, according to an equation for decryption. If the Equations (4) were relied upon to generate the encrypted data packages $M_i$, then the cryptography engine 192 is configured to decrypt each of the encrypted bit packages $M_i$ into a plain data package $x_i$, according to the following equation:

$$x_i = m_1 \oplus k_2 + m_2 \oplus k_3 - k_1 - m_3. \qquad (6)$$

If the Equations (5) were relied upon to generate the encrypted data packages $M_i$, then the cryptography engine 192 is configured to decrypt each of the encrypted data packages $M_i$ into a plain data package $x_i$, according to the following equation:

$$x_i = (m_1-k_4) \oplus k_2 + (m_2-k_5) \oplus k_3 - (m_3-k_7) \oplus k_6 - (m_4-k_9) \oplus k_8 - k_1. \qquad (7)$$

By decrypting the packages $M_1$, $M_2$, $M_3$, ... $M_m$, respectively, into the plain data packages $x_1$, $x_2$, $x_3$, ... $x_m$, the cryptography engine 192 is able to recapture the plain data $X_S$ from the computing device 160, by concatenating the plain data packages together. The plain data can be stored in the data store 175.

Figure 3:
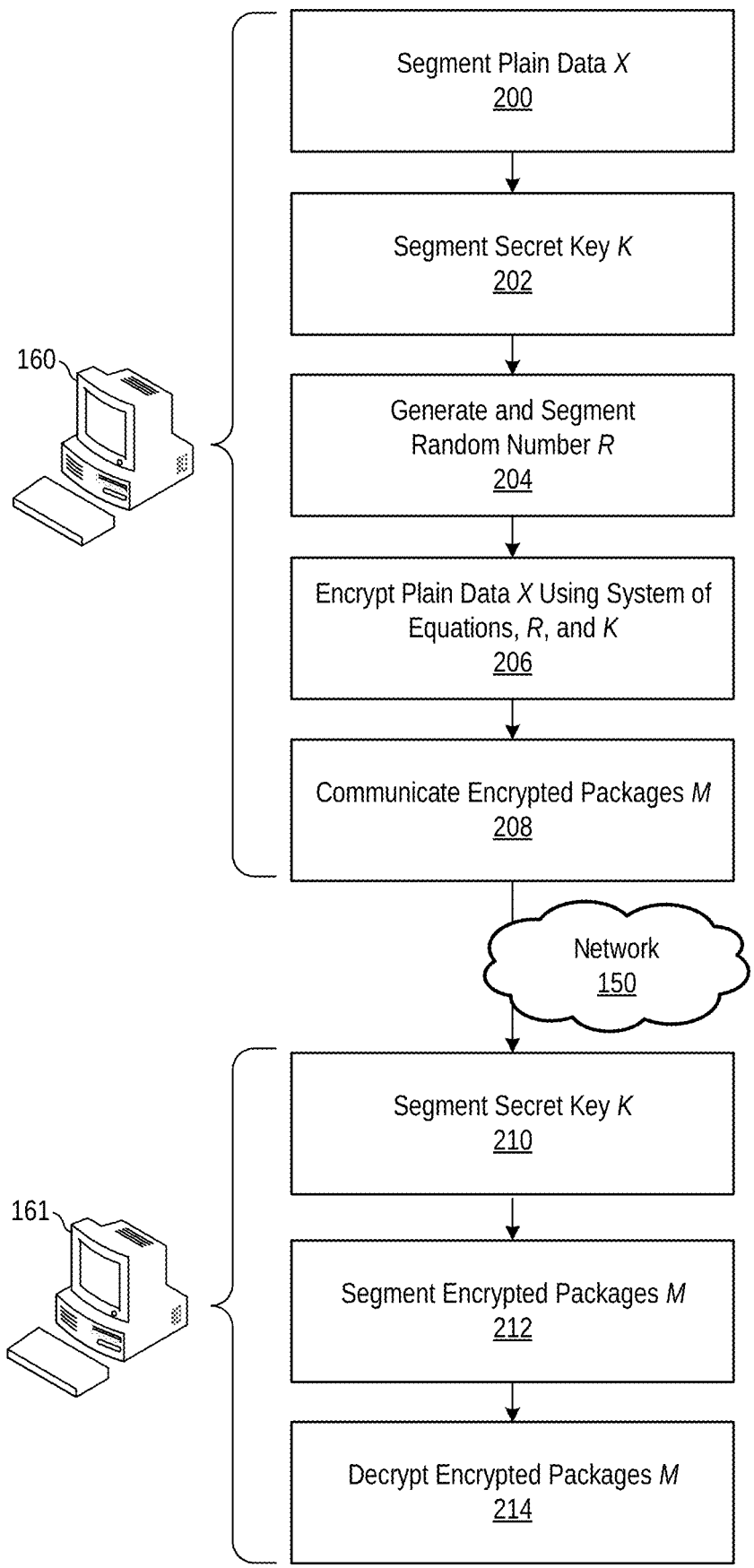
FIG. 3 illustrates a representative process of secure communications using the encryption techniques according to the embodiments described herein.

FIG. 3 illustrates a representative process of secure communications using the encryption techniques according to the embodiments described herein. In the example shown, the computing device 160 communicates encrypted data to the computing device 161 over the network 150. The process is described in connection with the computing devices 160 and 161 shown in FIG. 1, although other computing devices can perform the process. Although the flowchart shows an order of execution, the order of execution can differ from that which is shown. For example, the order of execution of two or more steps can be switched relative to the order shown or as described below. Also, two or more steps shown in succession can be executed concurrently or with partial concurrence. Further, in some examples, one or more of the steps can be skipped or omitted.

At reference numeral 200, the process includes dividing, separating, or segmenting plain data into data packages. For example, the process can include the cryptography engine 182 dividing or separating the plain data $X_S$ 173 into plain data packages $x_1, x_2, x_3, \ldots x_m$ according to Equation (1) above, or by another suitable approach. Each of the plain data packages x, can be two bytes in length in one example, although the size of the data packages can vary based on the type(s) of processors used in the computing devices 160 and 161, among other factors.

At reference numeral 202, the process includes dividing, separating, or segmenting a secret key into a set of secret key packages. For example, the process can include the cryptography engine 182 dividing or separating the secret key K 171 into secret key packages $k_1, k_2, k_3, \ldots k_n$ according to Equation (2) above, or by another suitable approach. Each of the secret key packages $k_i$ can be two bytes in length in one example, although the size of the data packages can vary based on the type(s) of processors used in the computing devices 160 and 161, among other factors.

At reference numeral 204, the process includes generating a randomization number and segmenting the randomization number into a set of random numbers. For example, the process can include the cryptography engine 182 directing the number generator 184 to generate a randomization number R. The process can also include the cryptography engine 182 dividing or segmenting the randomization number R into a set of random number packages $r_1, r_2, r_3, \ldots r_p$ according to Equation (3) above, or by another suitable approach. Each of the random numbers $r_i$ can be two bytes in length in one example, although the size of the data packages can vary based on the type(s) of processors used in the computing devices 160 and 161, among other factors.

At reference numeral 206, the process includes encrypting the plain data $X_S$ 173 into encrypted data packages by application of the plain data $X_S$ 173, the secret key K 171, and the randomization number R to a system of equations for encryption. The cryptography engine 182 can perform the process of encrypting in parts or segments of the plain data $X_S$ 173, as described herein. That is, the cryptography engine 182 can apply each segmented plain data package $x_1, x_2, x_3, \ldots x_m$ from reference numeral 200, respectively, to the system of equations for encryption. The system of equations can be the Equations (4), the Equations (5), or another system of linear equations consistent with the concepts described herein. For the Equations (4), the cryptography engine 182 can encrypt each plain data package $x_i$ with three (3) secret key packages $k_1, k_2,$ and $k_3$ from the segmenting at reference numeral 202 and two (2) random numbers $r_1$ and $r_2$ from the segmenting at reference numeral 204. For the Equations (5), the cryptography engine 182 can encrypt each plain data package $x_i$ with nine (9) secret key packages $k_1$-$k_9$ from the segmenting at reference numeral 202 and four (4) random numbers $r_1$-$r_4$ from the segmenting at reference numeral 204.

At reference numeral 206, the cryptography engine 182 also generates an encrypted data package $M_i$ for each plain data package $x_i$ by combining or concatenating the values of $m_1, m_2,$ and $m_3$ from the Equations (4). As another example, the cryptography engine 182 can generate an encrypted data package $M_i$ for each plain data package $x_i$ by combining or concatenating the values of $m_1, m_2, m_3,$ and $m_4$ from the Equations (5).

Further, after processing the plain data package $x_1$ to obtain the encrypted data package $M_1$, the process at reference numeral 206 can continue. The cryptography engine 182 can continue to process the subsequent plain data packages $x_2, x_3, \ldots x_m$, in turn, using the system of Equations (4), the system of Equations (5), or another system of linear equations, to generate the encrypted data packages $M_1, M_2, M_3, \ldots M_m$. In one case, the cryptography engine 182 can process the next plain data package $x_2$, among others, with the same secret key packages $k_1, k_2,$ and $k_3$ and the same random numbers $r_1$ and $r_2$ as used for the plain data package $x_1$. In another example, the cryptography engine 182 can process each respective plain data package $x_i$ with the same set of secret key packages $k_1, k_2,$ and $k_3$ but with a different set of random numbers from the number generator 184. The use of a different set of random numbers for each plain data package $x_i$ can provide better semantic security and ciphertext indistinguishability. In still other examples, the cryptography engine 182 can process each respective plain data package $x_i$ with a different set of secret key packages, with a different set of random numbers, or with both a different set of secret key packages and a different set of random numbers.

At reference numeral 208, the process includes the computing device 160 communicating the encrypted data packages $M_1, M_2, M_3, \ldots M_m$ to the computing device 161 over the network 150. The computing device 160 can communicate the encrypted data packages $M_1, M_2, M_3, \ldots M_m$ to the computing device 161 using any suitable network interfaces and network transfer protocols. The encrypted data packages $M_1, M_2, M_3, \ldots M_m$ can be sent from the computing device 160 to the computing device 161 in any number of data packets, for example, in any suitable way and sequence over time. Although not separately shown in FIG. 3, the process can also include the computing device 161 receiving each of the encrypted data packages $M_1, M_2, M_3, \ldots M_m$ from the computing device 160, and the process can include the computing device 161 storing the encrypted data packages in the data store 175.

The remaining process steps shown in FIG. 3 are performed by the computing device 161, to decrypt the encrypted data packages. At reference numeral 210, the process includes the cryptography engine 192 of the computing device 161 dividing, separating, or segmenting the secret key K 176 into secret key packages $k_1, k_2, k_3, \ldots k_n$ according to Equation (2) above, or by another suitable approach. As one example, if the Equations (4) were used for encryption, then the cryptography engine 192 can segment the secret key K 176 into three (3) segmented secret key packages $k_1, k_2,$ and $k_3$. As another example, if the Equations (5) were used for encryption, then the cryptography engine 192 can segment the secret key K 176 into nine (9) segmented secret key packages $k_1$-$k_9$. The full size of the secret key K 176 in bits, before being segmented, can thus depend on a number of factors, including the type(s) of processors used in the computing devices 160 and 161, the system of equations used, and other factors. As noted above, the secret key K 171, which is stored by the computing device 160, and the secret key K 176, which is stored by the computing device 161, are the same secret key K. Thus, the segmented secret key packages obtained at reference numeral 210 can be the same as those obtained at reference numeral 202.

At reference numeral 212, the process includes the cryptography engine 192 dividing or separating each of the encrypted data packages $M_1, M_2, M_3, \ldots M_m$ into encrypted data segments. As one example, if the Equations (4) were relied upon to encrypt the packages $M_1, M_2, M_3, \ldots M_m$, then the cryptography engine 192 can divide each encrypted data package into $m_1, m_2,$ and $m_3$. As another example, if the Equations (5) were relied upon to encrypt the packages $M_1, M_2, M_3, \ldots M_m$, then the cryptography engine 192 can divide each encrypted data package into $m_1, m_2, m_3,$ and $m_4$.

At reference numeral 214, the process includes decrypting each encrypted data package to a plain data package, by application of the encrypted data package and the secret key to an equation for decryption. That is, the process includes the cryptography engine 192 decrypting the segmented encrypted data packages and $m_1$, $m_2$, and $m_3$ for each $M_i$ into a plain data package $x_i$, according to an equation for decryption. If the Equations (4) were relied upon to generate the encrypted data packages $M_i$, then the cryptography engine 192 is configured to decrypt each of the encrypted bit packages $M_i$ into a plain data package $x_i$, according to the following equation:

$$x_i = m_1 \oplus k_2 + m_2 \oplus k_3 - k_1 - m_3. \tag{8}$$

If the Equations (5) were relied upon to generate the encrypted data packages $M_i$, then the cryptography engine 192 is configured to decrypt each of the encrypted data packages $M_i$ into a plain data package $x_i$, according to the following equation:

$$x_i = (m_1 - k_4) \oplus k_2 + (m_2 - k_5) \oplus k_3 - (m_3 - k_7) \oplus k_6 - (m_4 - k_9) \oplus k_9 - k_1. \tag{9}$$

By decrypting the packages $M_1$, $M_2$, $M_3$, ... $M_m$, respectively, into the plain data packages $x_1$, $x_2$, $x_3$, ... $x_m$, the cryptography engine 192 is able to recapture the plain data $X_S$ from the computing device 160, by concatenating the plain data packages together. The plain data can be stored in the data store 175.

Turning to other aspects of the embodiments, the concepts described herein can also be used with a centralized authentication system, such as the authentication system 100 shown in FIG. 1, to offer additional security and benefits. To achieve the benefits of the centralized authentication system 100, the computing devices 160 and 161, among others, can register with the authentication system 100. The computing devices 160 and 161 can separately register with the authentication system 100, at any time, as described in further detail below with reference to FIG. 4.

As part of the registration of the computing devices 160 and 161 with the authentication system 100, the authentication system 100 can obtain authentication credentials from the computing devices 160 and 161. The authentication system 100 can also operate on or combine the authentication credentials from the computing devices 160 and 161, to generate a combined credential for the computing devices 160 and 161.

After registration with the authentication system 100 is complete, the computing devices 160 and 161 can communicate encrypted data with each other, using an approach that is similar to that described above with reference to FIGS. 1-3. In addition to those techniques, the computing devices 160 and 161 can also exchange an identity credential through the authentication system 100. Through the exchange with the authentication system 100, the computing devices 160 and 161 can verify or confirm each other, similar to the way a digital signature is used.

Figure 4:
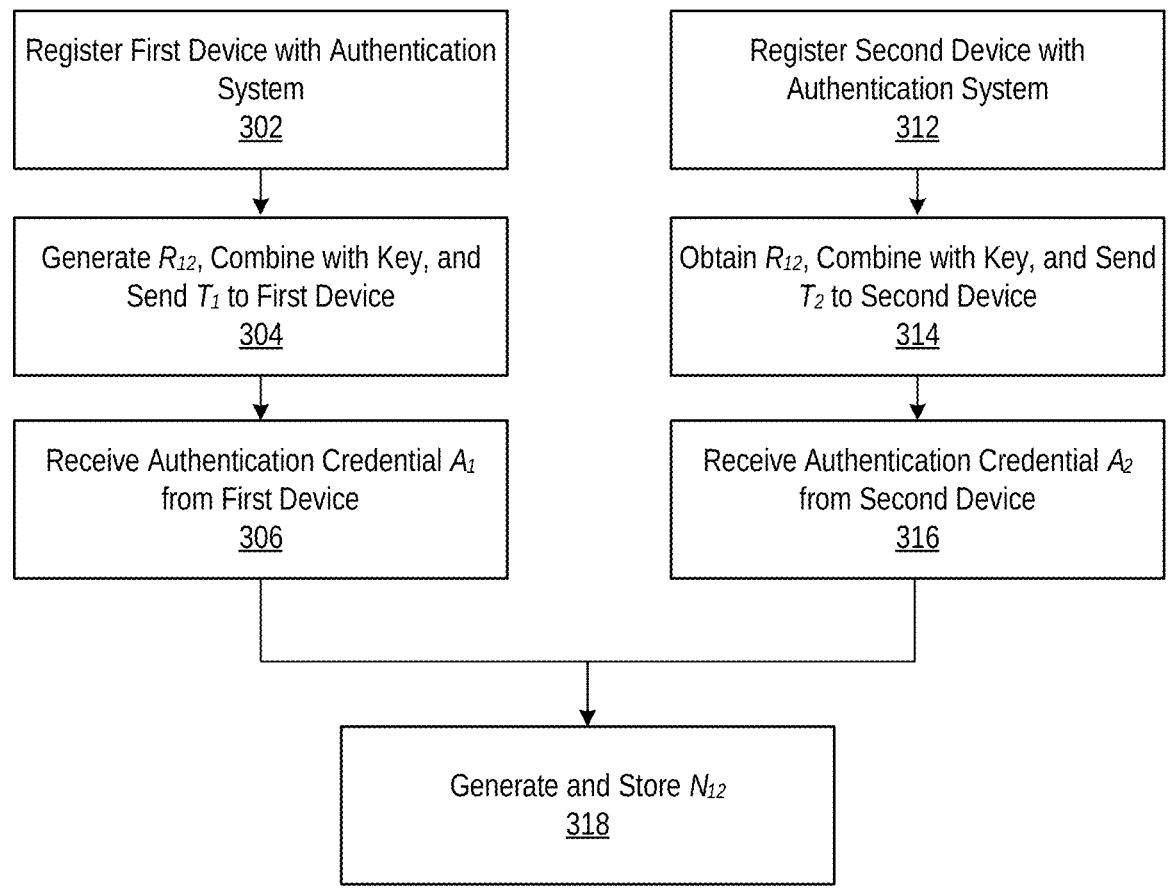
FIG. 4 illustrates a representative process for device registration according to the embodiments described herein.

FIG. 4 illustrates a representative process for device registration according to the embodiments described herein. The process is described in connection with the authentication system 100 and the computing devices 160 and 161 shown in FIG. 1, although other computing systems and devices can perform the process. Although the flowchart shows an order of execution, the order of execution can differ from that which is shown. For example, the order of execution of two or more steps can be switched relative to the order shown or as described below. Also, two or more steps shown in succession can be executed concurrently or with partial concurrence. Further, in some examples, one or more of the steps can be skipped or omitted.

At reference numeral 302, the process includes the authentication system 100 registering the computing device 160. This registration can include exchanging certain credentials, such as device identifiers (e.g., media access control (MAC) addresses of network interface controllers), usernames, passwords, or other credentials between the computing device 160 and the authentication system 100. The authentication system 100 can store a list, table, or database of registered devices, including the computing device 160, in the data store 120. The registration at reference numeral 302 can also include the exchange of a common key $K_A$ between the computing device 160 and the authentication system 100, which is used in later process steps.

At reference numeral 304, the process includes the authentication system 100 generating a credential randomization number $R_{12}$. The authentication system 100 can also store the credential randomization number $R_{12}$ in the data store 120 for use with another computing device as described below. At reference numeral 304, the process can also include the authentication system 100 combining the key $K_A$ with $R_{12}$, to generate a transfer key $T_1$ according to $T_1 = K_A \oplus R_{12}$. The authentication system 100 also sends the transfer key $T_1$ to the computing device 160 over the network 150 at reference numeral 304. The transfer key $T_1$ is used by the computing device 160 to securely return an authentication identifier $N_1$ back to the authentication system 100, as described below.

Although not separately shown in FIG. 4, the computing device 160 receives the transfer key $T_1$ over the network 150. The computing device 160 processes the transfer key $T_1$ to obtain the randomization number $R_{12}$, according to $R_{12} = K_A \oplus T_1$. The computing device 160 can also store the randomization number $R_{12}$ in the data store 170. The computing device 160 also generates an authentication identifier $N_1$, which is unique to the computing device 160. For example, the cryptography engine 182 can direct the number generator 184 to generate the authentication identifier $N_1$. The authentication identifier $N_1$ acts as a type of signature for the computing device 160. The computing device 160 stores the authentication identifier $N_1$ in the data store 170 as the Auth ID $N_1$ 172, as shown in FIG. 2. The authentication identifier $N_1$ can be a uniformly distributed random number or any other suitable unique identification number for the computing device 160.

The cryptography engine 182 of the computing device 160 is configured to combine the authentication identifier $N_1$ with the randomization number $R_{12}$, to generate an authentication credential $A_1$, according to $A_1 = N_1 \oplus R_{12}$. The computing device 160 then sends the authentication credential $A_1$ to the authentication system 100, and the authentication system 100 receives the authentication credential $A_1$ from the computing device 160 at reference numeral 306 in FIG. 4. The authentication system 100 stores the authentication credential $A_1$ in the data store 120.

Registration of the computing device 160 by the authentication system 100 is complete after the authentication credential $A_1$ is received from the computing device 160. However, registration of the computing device 161 occurs separately, and the authentication system 100 cannot generate the combined credential for the computing devices 160 and 161 until after the computing device 161 is also registered.

Thus, at reference numeral 312 in FIG. 4, the process also includes the authentication system 100 registering the computing device 161. This registration can include exchanging certain credentials, such as device identifiers (e.g., media access control (MAC) addresses of network interface controllers), usernames, passwords, or other credentials between the computing device 161 and the authentication system 100. The authentication system 100 can store a list, table, or database of registered devices, including the computing device 161, in the data store 120. The registration at reference numeral 312 can also include the exchange of a common key $K_B$ between the computing device 161 and the authentication system 100, which is used in later process steps.

At reference numeral 314, the process includes the authentication system 100 obtaining the credential randomization number $R_{12}$ from the data store 120. This assumes that the credential randomization number $R_{12}$, which was generated at reference numeral 304 and associated with the computing device 160, will not be used with computing devices other than the computing devices 160 and 161. For example, at reference numeral 314, the authentication system 100 can reserve the randomization number $R_{12}$ for use in authentication services between the computing devices 160 and 161 and only the computing devices 160 and 161.

At reference numeral 314, the process can also include the authentication system 100 combining the key $K_B$ with $R_{12}$, to generate a transfer key $T_2$ according to $T_1 = K_A \oplus R_{12}$. The authentication system 100 also sends the transfer key $T_2$ to the computing device 161 over the network 150 at reference numeral 314. The transfer key $T_2$ is used by the computing device 161 to securely return an authentication identifier $N_2$ back to the authentication system 100, as described below.

Although not separately shown in FIG. 4, the computing device 161 receives the transfer key $T_2$ over the network 150. The computing device 161 processes the transfer key $T_2$ to obtain the randomization number $R_{12}$, according to $R_{12} = K_B \oplus T_2$. The computing device 161 can also store the randomization number $R_{12}$ in the data store 175. The computing device 161 also generates an authentication identifier $N_2$, which is unique to the computing device 161. For example, the cryptography engine 192 can direct the number generator 184 to generate the authentication identifier $N_2$. The authentication identifier $N_2$ acts as a type of signature for the computing device 161. The computing device 161 stores the authentication identifier $N_2$ in the data store 175 as the Auth ID $N_2$ 177, as shown in FIG. 2. The authentication identifier $N_2$ can be a uniformly distributed random number or any other suitable unique identification number for the computing device 161.

The cryptography engine 192 of the computing device 161 is configured to combine the authentication identifier $N_2$ with the randomization number $R_{12}$, to generate an authentication credential $A_2$, according to $A_2 = N_2 \oplus R_{12}$. The computing device 161 sends the authentication credential $A_2$ to the authentication system 100, and the authentication system 100 receives the authentication credential $A_2$ from the computing device 161 at reference numeral 316 in FIG. 4. The authentication system 100 also stores the authentication credential $A_2$ in the data store 120.

Registration of the computing device 161 by the authentication system 100 is complete after the authentication credential $A_2$ is received from the computing device 161. At this point, both the computing devices 160 and 161 are registered with the authentication system 100. At reference numeral 318 in FIG. 4, the process includes the authentication system 100 generating a combined credential $N_{12}$ for the computing devices 160 and 161, according to $N_{12} = A_1 \oplus A_2$, as $A_1 \oplus A_2 = N_1 \oplus R_{12} \oplus N_2 \oplus R_{12}$. The authentication system 100 can also store the combined credential $N_{12}$ in the data store 120, for use in later authentication operations between the computing devices 160 and 161.

Figure 5:
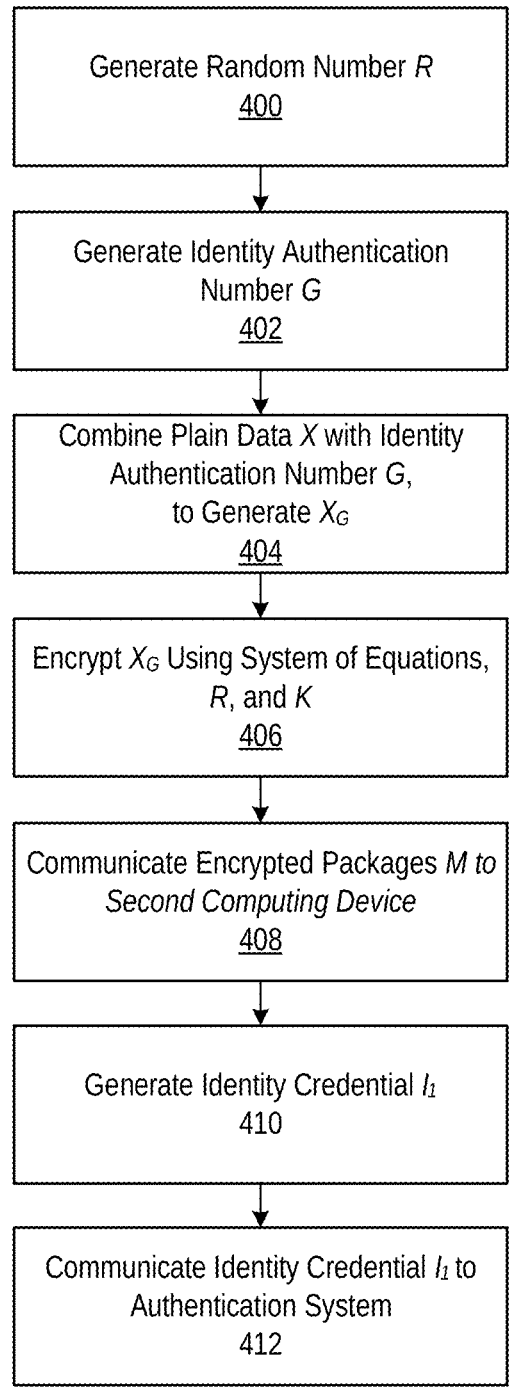
FIG. 5 illustrates an example process for secure data transmission with authentication according to the embodiments described herein.

Turning to other embodiments, FIG. 5 illustrates an example process for secure data transmission with authentication. At the outset in FIG. 5, it is assumed that both the computing devices 160 and 161 have registered with the authentication system 100 and that the authentication system 100 has stored the combined credential $N_{12}$, as described above with reference to FIG. 4. The process shown in FIG. 5 builds upon the process shown in FIG. 3, but it also includes additional process steps for authentication. The process shown in FIG. 5 is described in connection with the computing devices 160 and 161 and the authentication system 100 shown in FIG. 1, although other computing devices and systems can perform the process. Although the flowchart shows an order of execution, the order of execution can differ from that which is shown. For example, the order of execution of two or more steps can be switched relative to the order shown or as described below. Also, two or more steps shown in succession can be executed concurrently or with partial concurrence. Further, in some examples, one or more of the steps can be skipped or omitted.

At reference numeral 400, the process includes the computing device 160 generating a randomization number R. Here, the cryptography engine 182 can direct the number generator 184 (FIG. 2) to generate a randomization number R. The randomization number R can be a uniformly distributed random number in one example. The cryptography engine 182 can also segment the randomization number R into a set of segmented random number packages $r_i$, according to Equation (3) above or in another suitable way.

At reference numeral 402, the process includes the computing device 160 generating an identity number G. The cryptography engine 182 can direct the number generator 184 (FIG. 2) to generate the identity number G, for example, which is relied upon in later steps to verify the identity of the computing device 160, through the authentication system 100. The identity number G can be any unique number, such as a uniformly distributed random number. The size of the identity number G, in bits, can vary, but should be at least as large at the size of one segmented plain data package $x_i$.

At reference numeral 404, the process includes the cryptography engine 182 combining the plain data $X_S$ 173, in segments, with the identity number G, to generate identified data $X_G$. As part of this process, the cryptography engine 182 can also divide or separate the plain data $X_S$ 173 into segmented plain data packages $x_i$, according to Equation (1) above or in another suitable way. When the plain data $X_S$ 173 is segmented into the plain data packages $x_i$, the cryptography engine 182 can combine each segmented plain data package $x_i$ with the identity number G, according to $x_{Gi} = x_i \oplus G$, to generate segmented identified data packages $x_{Gi}$. The combination (e.g., concatenated or strung together combination) of all identified data packages $x_{Gi}$ can be referred to as the identified data $X_G$. The cryptography engine 182 can also store the identified data $X_G$ in the data store 170.

At reference numeral 406, the process includes the cryptography engine 182 encrypting the identified data $X_G$ into encrypted data packages by application of the identified data $X_G$, the secret key K 171, and the randomization number R to a system of equations for encryption. The cryptography engine 182 can perform the process in parts or segments of the identified data $X_G$. That is, the cryptography engine 182 can apply each identified data package $x_{G1}, x_{G2}, x_{G3}, \ldots x_{Gm}$, respectively, to the system of equations for encryption, along with the segments of the secret key K 171 and the segments of the randomization number R, as described herein. The system of equations can be the Equations (4), the Equations (5), or another system of linear equations consistent with the concepts described herein. Thus, the process at reference numeral 406 is similar to that in reference numeral 206 of FIG. 2, although the identified data packages $x_{Gi}$ are substituted for the plain data package $x_i$.

At reference numeral 406, the cryptography engine 182 also generates an encrypted data package $M_i$ for each identified data package $x_{Gi}$ by combining or concatenating the values of $m_1$, $m_2$, and $m_3$ from the Equations (4). As another example, the cryptography engine 182 can generate an encrypted data package $M_i$ for each identified data package $x_{Gi}$ by combining or concatenating the values of $m_1$, $m_2$, $m_3$, and $m_4$ from the Equations (5).

At reference numeral 408, the process includes the computing device 160 communicating the encrypted data packages $M_1$, $M_2$, $M_3$, ... $M_m$ to the computing device 161 over the network 150. The computing device 160 can communicate the encrypted data packages $M_1$, $M_2$, $M_3$, ... $M_m$ to the computing device 161 using any suitable network interfaces and network transfer protocols. The encrypted data packages $M_1$, $M_2$, $M_3$, ... $M_m$ can be sent from the computing device 160 to the computing device 161 in any number of data packets, for example, in any suitable way and sequence over time. Although not separately shown in FIG. 3, the process can also include the computing device 161 receiving each of the encrypted data packages $M_1$, $M_2$, $M_3$, ... $M_m$ from the computing device 160, and the process can include the computing device 161 storing the encrypted data packages in the data store 175.

In addition to the transfer of the encrypted data packages $M_1$, $M_2$, $M_3$, ... $M_m$, the process in FIG. 5 includes certain steps to facilitate authentication and the confirmation of the identity of the computing device 160 for the computing device 161, similar to a digital signature. To that end, at reference numeral 410, the process includes the cryptography engine 182 preparing an identity credential $I_1$. The cryptography engine 182 can prepare the identity credential $I_1$ based on a combination of the Auth ID $N_1$ 172 of the computing device 160, which was generated when the computing device 160 registered with the authentication system 100 (e.g., as in FIG. 4), and the identity number G, according to $I_1 = N_1 \oplus G$. At reference numeral 410, the process includes the computing device 160 communicating the identity credential $I_1$ to the authentication system 100.

Although not shown in FIG. 5, the authentication system 100 can process the identity credential $I_1$ received from the computing device 160, to generate a verification credential $V_1$ for the computing device 161. Particularly, the authentication system 100 can process the identity credential $I_1$ with the combined credential $N_{12}$, which was previously generated at reference numeral 318 in FIG. 4, according to $V_1 = I_1 \oplus N_{12}$. $I_1$ is equivalent to $N_1 \oplus G$ and $N_{12}$ is equivalent to $N_1 \oplus N_2$, so $V_1 = I_1 \oplus N_{12} = N_1 \oplus G \oplus N_1 \oplus N_2 = G \oplus N_2$. Thus, the verification credential $V_1$ is equal to $G \oplus N_2$, and the computing device 161 can obtain the identity number G of the computing device 160 from the verification credential $V_1$. The authentication system 100 communicates the verification credential $V_1$ to the computing device 161.

The authentication system 100 has no visibility into the identity number G of the computing device 160, because the authentication system 100 does not have access to the Auth ID $N_2$ 177 of the computing device 161. Likewise, the authentication system 100 does not have access to the Auth ID $N_1$ 172 of the computing device 160. Instead, the authentication system 100 only stores the combined credential $N_{12}$, but the individual values of $N_1$ and $N_2$ cannot be obtained by the authentication system 100 from the combined credential $N_{12}$.

Figure 6:
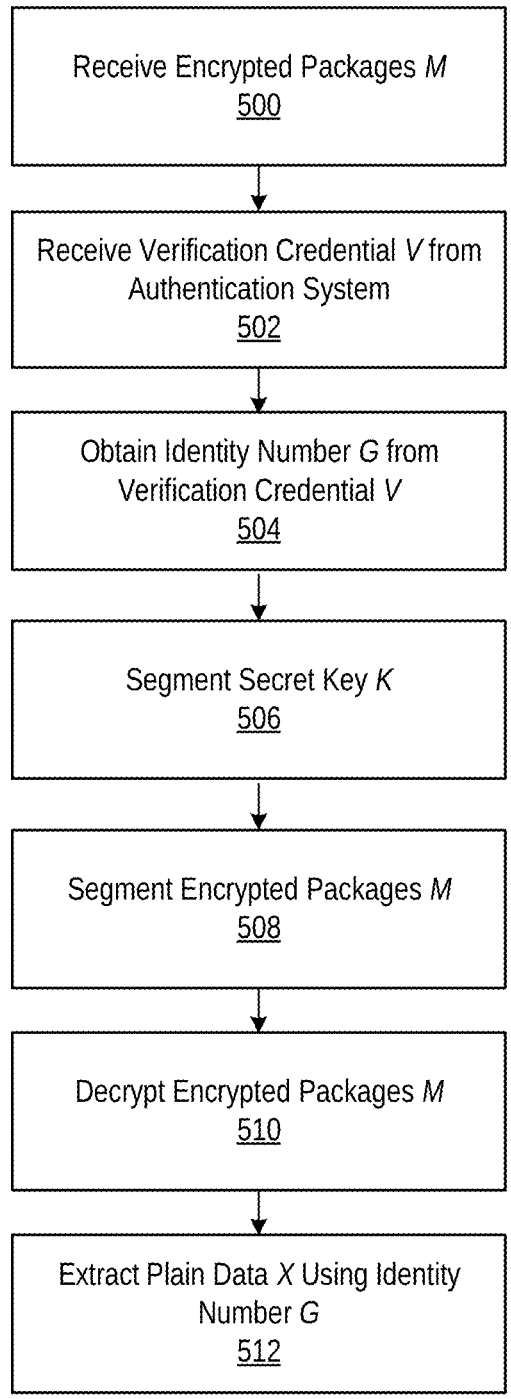
FIG. 6 illustrates an example process for secure data reception with authentication according to the embodiments described herein.

FIG. 6 illustrates an example process for secure data reception with authentication according to the embodiments described herein. FIG. 6 is directed to the steps performed by the computing device 161 for secure data reception with authentication, as a corollary to the steps performed by the computing device 160 in FIG. 5 for secure data transmission with authentication. At the outset in FIG. 6, it is assumed that both the computing devices 160 and 161 have registered with the authentication system 100 and that the authentication system 100 has stored the combined credential $N_{12}$, as described above with reference to FIG. 4. The process shown in FIG. 6 builds upon the process shown in FIG. 3, but it also includes additional process steps for authentication. The process shown in FIG. 6 is described in connection with the computing devices 160 and 161 and the authentication system 100 shown in FIG. 1, although other computing devices and systems can perform the process. Although the flowchart shows an order of execution, the order of execution can differ from that which is shown. For example, the order of execution of two or more steps can be switched relative to the order shown or as described below. Also, two or more steps shown in succession can be executed concurrently or with partial concurrence. Further, in some examples, one or more of the steps can be skipped or omitted.

At reference numeral 500, the process includes the computing device 161 receiving the encrypted data packages $M_1$, $M_2$, $M_3$, ... $M_m$ from the computing device 160. The computing device 161 can store the encrypted data packages $M_1$, $M_2$, $M_3$, ... $M_m$ in the data store 175 for further processing. Additionally, at reference numeral 502, the process includes the computing device 161 receiving the verification credential $V_1$ from the authentication system. As noted above, the verification credential $V_1$ is equal to $G \oplus N_2$, and the computing device 161 can obtain the identity number G of the computing device 160 from the verification credential $V_1$. The computing device 161 can store the verification credential $V_1$ in the data store 175 for further processing.

At step 504, the process includes the cryptography engine 192 obtaining the identity number G of the computing device 160 from the verification credential $V_1$. Particularly, the cryptography engine 192 can process the verification credential $V_1$ with the Auth ID $N_2$ 177, which was previously generated during registration of the computing device 161 with the authentication system 100, according to $G = V_1 \oplus N_2$, as $V_1$ is equal to $G \oplus N_2$. The cryptography engine 192 can store the identity number G in the data store 175.

At reference numeral 506, the process includes the cryptography engine 192 of the computing device 161 dividing, separating, or segmenting the secret key K 176 into secret key packages $k_1$, $k_2$, $k_3$, ... $k_n$ according to Equation (2) above, or by another suitable approach. As one example, if the Equations (4) were used for encryption, then the cryptography engine 192 can segment the secret key K 176 into three (3) segmented secret key packages $k_1$, $k_2$, and $k_3$. As another example, if the Equations (5) were used for encryption, then the cryptography engine 192 can segment the secret key K 176 into nine (9) segmented secret key packages $k_1$-$k_9$.

At reference numeral 508, the process includes the cryptography engine 192 dividing or separating each of the encrypted data packages $M_1$, $M_2$, $M_3$, ... $M_m$ into encrypted data segments. As one example, if the Equations (4) were relied upon to encrypt the packages $M_1$, $M_2$, $M_3$, ... $M_m$, then the cryptography engine 192 can divide each encrypted data package into $m_1$, $m_2$, and $m_3$. As another example, if the Equations (5) were relied upon to encrypt the packages $M_1$, $M_2$, $M_3$, ... $M_m$, then the cryptography engine 192 can divide each encrypted data package into $m_1$, $m_2$, $m_3$, and $m_4$.

At reference numeral 510, the process includes decrypting each encrypted data package to a plain data package, by application of the encrypted data package and the secret key to an equation for decryption. That is, the process includes the cryptography engine 192 decrypting the segmented encrypted data packages and $m_1$, $m_2$, and $m_3$ for each $M_i$ into an identified data package $x_{Gi}$, according to an equation for decryption. If the Equations (4) were relied upon to generate the encrypted data packages $M_i$, then the cryptography engine 192 is configured to decrypt each of the encrypted bit packages $M_i$ into an identified data package $x_{Gi}$, according to the following equation:

$$x_{Gi} = m_1 \oplus k_2 + m_2 \oplus k_3 - k_1 - m_3. \tag{8}$$

If the Equations (5) were relied upon to generate the encrypted data packages $M_i$, then the cryptography engine 192 is configured to decrypt each of the encrypted data packages $M_i$ into an identified data package $x_{Gi}$, according to the following equation:

$$X_{Gi} = (m_1-k_4) \oplus k_2 + (m_2-k_5) \oplus k_3 - (m_3-k_7) \oplus k_6 - (m_4-k_9) \oplus k_8 - k_1. \tag{9}$$

Thus, each of the packages $M_1$, $M_2$, $M_3$, ... $M_m$ can be decrypted, respectively, into the identified data packages $x_{G1}$, $x_{G2}$, $x_{G3}$, ... $x_{Gm}$.

At reference numeral 512, the process includes the cryptography engine 182 extracting plain data packages $x_i$ from the identified data packages $x_{Gi}$. Here, the cryptography engine 192 can extract plain data packages $x_i$ from the identified data packages $x_{Gi}$ by application of the identity number G, according to $x_i = x_{Gi} \oplus G$. The combination (e.g., concatenated or strung together combination) of all plain data packages x, results in the plain data $X_S$ from the computing device 160, by concatenating the plain data packages together. The plain data can be stored in the data store 175.

According to the concepts of authentication described herein, the integrity of data communication between the computing devices 160 and 161 depends on proper authentication of both devices with the authentication system 100. In other words, the computing device 161 cannot decrypt and obtain the data communicated from the computing device 160 (i.e., with the same data integrity and meaning), unless the identity number G generated by the computing device 160 at reference numeral 402 in FIG. 5 is also securely transferred through the authentication system 100.

In other aspects of the embodiments, it is noted that the systems in Equations (4) and (5) provide ciphertext (e.g., the encrypted data packages $M_1$, $M_2$, $M_3$, ... $M_m$) that is protected against security concerns that arise when communicating recurring plain data packages, plain data packages that are known by an attacker, or plain data packages that are chosen by an attacker. To demonstrate, assume a sender S uses an encryption algorithm to send to plain text x to a receiver R. As a result of the algorithm, S generates three publicly-visible values $s_1$, $s_2$ and $s_3$ using the following non-linear system of three equations as basic algorithm:

$$s_1 = k + a_1,$$

$$s_2 = x + a_2, \text{ and}$$

$$s_3 = a_1 a_2. \tag{8}$$

The algorithm relies upon random values $a_1$ and $a_2$ and two recurring values, including the secret key k and the plain text x. R knows the key k and can decrypt (calculate) the plain text x, according to:

$$x = s_2 + \frac{s_3}{s_1 - k}. \tag{9}$$

A third party cannot decrypt the plain text x, because $s_1$, $s_2$ and $s_3$ are the only visible values. A third party would need to obtain four independent unknown variables, as the number of unknown variables (e.g., x, k, $a_1$, $a_2$) exceeds the number of visible values. The system of Equations 6 is undetermined for the third party and, thus, cannot be resolved. Cannot be resolved means that there is no unique solution of the system of equations due to the unknown variables.

However, in case S sends a recurring x to R, the third party can decrypt the plain text x and obtain the key k from the system of Equations 6, as shown in Table 1 below. This occurs because the number of visible values equals or exceeds the number of independent variables in any next, subsequent attack.

TABLE 1

| Attack | System of equations | Number of new independent variables | Number of independent visible values |
|---|---|---|---|
| First | $\begin{cases} s_1^{(1)} = k + a_1^{(1)} \\ s_2^{(1)} = x + a_2^{(1)} \\ s_3^{(1)} = a_1^{(1)} a_2^{(1)} \end{cases}$ | 4 | 3 |
| Second | $\begin{cases} s_1^{(2)} = k + a_1^{(2)} \\ s_2^{(2)} = x + a_2^{(2)} \\ s_3^{(2)} = a_1^{(2)} a_2^{(2)} \end{cases}$ | 2 | 3 |
| Both | | 6 | 6 |

Thus, in case S sends a recurring x to R, the third party can use six publicly visible values ($s_1^{(1)}$, $s_2^{(1)}$, $s_3^{(1)}$, $s_1^{(2)}$, $s_2^{(2)}$, $s_3^{(2)}$) to obtain six independent variables (k, x, $a_1^{(1)}$, $a_2^{(1)}$, $a_1^{(2)}$, $a_2^{(2)}$). The third party can obtain the secret key k from the following equation:

$$\frac{s_3^{(1)}}{s_1^{(1)} - x} - \frac{s_3^{(2)}}{s_1^{(2)} - x} = s_2^{(1)} - s_2^{(2)}$$

and the plain text x from the following equation:

$$\frac{s_3^{(1)}}{s_2^{(1)} - k} - \frac{s_3^{(2)}}{s_2^{(2)} - k} = s_1^{(1)} - s_1^{(2)}.$$

S can make the algorithm more complex using longer vector of authentication attribute, but the number of secure, non-decrypted attacks will be limited. In this case, the authentication attribute should be changed after certain secure attacks in order to extend the algorithm security lifetime.

As a different example, assume S uses an encryption algorithm to send plain text to R. As a result of the algorithm, S sends three publicly visible values $s_1$, $s_2$ and $s_3$ using the following non-linear system of equations:

$$s_1 = k + a_1,$$

$$s_2 = x + a_2, \text{ and}$$

$$s_3 = a_1 + a_2. \tag{10}$$

The algorithm relies upon random values $a_1$ and $a_2$ and two recurring values, including the secret key k and the plain text x. R knows the key k and can decrypt the plain text x, according to:

$$x = s_2 + s_1 - s_3 - k. \tag{11}$$

A third party cannot decrypt the plain text x, because $s_1$, $s_2$ and $s_3$ are the only visible values. A third party would need to obtain four independent unknown variables, as the number of unknown variables (e.g., x, k, $a_1$, $a_2$) exceeds the number of visible values. The system of Equations 6 is undetermined for the third party and, thus, cannot be resolved.

Additionally, in case S sends a recurring x to R, unlike in the previous example, the third party cannot decrypt the plain text x or obtain the key k from the system of Equations 8, because it still remains underdetermined as shown in Table 2. This is because the Equations 8 are a linear dependent system.

TABLE 2

| Attack | System of equations | Number of new independent variables | Number of independent visible values |
|---|---|---|---|
| First | $\begin{cases} s_1^{(1)} = k + a_1^{(1)} \\ s_2^{(1)} = x + a_2^{(1)} \\ s_3^{(1)} = a_1^{(1)} a_2^{(1)} \end{cases}$ | 4 | 3 |
| Second | $\begin{cases} s_1^{(2)} = k + a_1^{(2)} \\ s_2^{(2)} = x + a_2^{(2)} \\ s_3^{(2)} = a_1^{(2)} a_2^{(2)} \end{cases}$ | 2 | 2 |
| Both | | 6 | 5 |

Thus, R knows the secret key k and can easily decrypt the plain text x, while the third party has only five publicly visible values ($s_1^{(1)}$, $s_2^{(1)}$, $s_3^{(1)}$, $s_1^{(2)}$, $s_2^{(2)}$) to obtain six independent variables (k, x, $a_1^{(1)}$, $a_2^{(1)}$, $a_1^{(2)}$, $a_2^{(2)}$). The value $s_3^{(2)}$ is not independent and can be obtained from other visible independent values, as $s_3^{(2)} = s_1^{(2)} + s_1^{(2)} + s_3^{(1)} - s_1^{(1)} - s_2^{(1)}$, so R can decrypt the plain text x, although the third party has only five publicly visible independent values.

It is also noted that certain devices, and particularly low-power devices, can be limited in terms of register sizes, the capability of processing block sizes (in bits), and other constraints. For example, the processor cores in the computing devices 160-164 may have a 16-bit, 32-bit, or 64-bit base. In that context, the cryptographic algorithms described herein can be tailored to avoid size overflows in processing operations. As examples, for a 47-bit key length on a processor of 16, 32, or 64 bit base, the variables for the Equations (4) can be sized as follows, where bit sizes are identified within the brackets:

$$(k_1[15] + r_1[15]) \oplus k_2[16] = m_1[16],$$

$$(x[15] + r_2[15]) \oplus k_3[16] = m_2[16], \text{ and}$$

$$r_1[15] + r_2[15] = m_3[16]. \tag{12}$$

As another example, for a 95-bit key length on a processor of 16, 32, or 64 bit base, the variables for the Equations (4) can be sized as follows, where bit sizes are identified within the brackets:

$$(k_1[31] + r_1[31]) \oplus k_2[32] = m_1[32],$$

$$(x[31] + r_2[31]) \oplus k_3[32] = m_2[32], \text{ and}$$

$$r_1[31] + r_2[31] = m_3[32]. \tag{13}$$

As another example, for a 189-bit key length on a processor of 64 bit base, the variables for the Equations (4) can be sized as follows, where bit sizes are identified within the brackets:

$$(k_1[61] + r_1[61]) \oplus k_2[64] = m_1[64],$$

$$(x[61] + r_2[61]) \oplus k_3[64] = m_2[64], \text{ and}$$

$$r_1[61] + r_2[61] = m_3[64]. \tag{14}$$

As another example, for a 139-bit key length on a processor of 16, 32, or 64 bit base, the variables for the Equations (5) can be sized as follows, where bit sizes are identified within the brackets:

$$(k_1[14] + r_1[13] + r_3[13]) \oplus k_2[15] + k_4[15] = m_1[16],$$

$$(x[14] + r_2[13] + r_4[13]) \oplus k_3[15] + k_5[15] = m_2[16],$$

$$(r_1[13] + r_2[13]) \oplus k_6[15] + k_7[15] = m_3[16], \text{ and}$$

$$(r_3[13] + r_4[13]) \oplus k_8[15] + k_9[15] = m_4[16]. \tag{15}$$

As another example, for a 278-bit key length on a processor of 32 or 64 bit base, the variables for the Equations (5) can be sized as follows, where bit sizes are identified within the brackets:

$$(k_1[30] + r_1[29] + r_3[29]) \oplus k_2[31] + k_4[31] = m_1[32],$$

$$(x[30] + r_2[29] + r_4[29]) \oplus k_3[31] + k_5[31] = m_2[32],$$

$$(r_1[29] + r_2[29]) \oplus k_6[31] + k_7[31] = m_3[32], \text{ and}$$

$$(r_3[29] + r_4[29]) \oplus k_8[31] + k_8[31] = m_4[32]. \tag{16}$$

As another example, for a 566-bit key length on a processor of 64 bit base, the variables for the Equations (5) can be sized as follows, where bit sizes are identified within the brackets:

$$(k_1[62] + r_1[61] + r_3[61]) \oplus k_2[63] + k_4[63] = m_1[64],$$

$$(x[62] + r_2[61] + r_4[61]) \oplus k_3[63] + k_5[63] = m_2[64],$$

$$(r_1[61] + r_2[61]) \oplus k_6[63] + k_7[63] = m_3[64], \text{ and}$$

$$(r_3[61] + r_4[61]) \oplus k_8[63] + k_9[63] = m_4[64]. \tag{17}$$

The flowcharts in FIGS. 3-6 show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

The authentication system 100 can include at least one processing circuit. Such a processing circuit can include, for example, one or more processors and one or more storage devices that are coupled to a local interface. The local interface can include, for example, a data bus with an accompanying address/control bus or any other suitable bus structure. Similarly, each of the computing devices 160-164 can include at least one processing circuit. Such a processing circuit can include, for example, one or more processors and one or more storage devices that are coupled to a local interface.

The storage devices for a processing circuit can store data or components that are executable by the processors of the processing circuit. For example, the authentication engine 132, the cryptography engine 182, the cryptography engine 192, and/or other components can be stored in one or more storage devices and be executable by one or more processors in the authentication system 100, the computing device 160, and the computing device 161.

The authentication engine 132, the cryptography engine 182, the cryptography engine 192, and/or other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that include software or program instructions can be embodied in any non-transitory computer-readable medium memory device for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described can be executed in one computing device or by using multiple computing devices.

Further, any logic or applications described herein, including the authentication engine 132, the cryptography engine 182, the cryptography engine 192, and/or other components can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices. Additionally, terms such as "application," "service," "system," "engine," "module," and so on can be used interchangeably and are not intended to be limiting.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Disjunctive language, such as the phrase "at least one of X, Y, or Z," unless specifically stated otherwise, is to be understood with the context as used in general to present that an item, term, etc., can be either X, Y, or Z, or any combination thereof (e.g., X, Y, and/or Z). Thus, such disjunctive language is not generally intended to, and should not, imply that certain embodiments require at least one of X, at least one of Y, or at least one of Z to be each present.

It should be emphasized that the above-described embodiments of the present disclosure are merely possible examples of implementations set forth for a clear understanding of the principles of the disclosure. Many variations and modifications can be made to the above-described embodiment(s) without departing substantially from the spirit and principles of the disclosure. All such modifications and variations are intended to be included herein within the scope of this disclosure and protected by the following claims.

Therefore, at least the following is claimed:

1. A method for cryptographic communications, comprising:
   storing a secret key;
   generating a randomization number;
   encrypting, by a first computing device, a plain data package into an encrypted data package by application of a system of equations to the plain data package, the secret key, and the randomization number; and
   communicating the encrypted data package to a second computing device, wherein:
   x is the plain data package;
   the secret key comprises a set of secret key packages $k_1$, $k_2$ and $k_3$;
   the randomization number comprises a set of random number packages $r_1$ and $r_2$; and
   the system of equations for encryption comprises:

$$(k_1+r_1) \oplus k_2 = m_1,$$

$$(x+r_2) \oplus k_3 = m_2, \text{ and}$$

$$r_1 + r_2 = m_3, \text{ where}$$

the encrypted data package comprises $m_1$, $m_2$, $m_3$.

2. The method according to claim 1, wherein the system of equations comprises linearly dependent equations.

3. The method according to claim 1, wherein:
the secret key comprises a set of secret key packages;
the randomization number comprises a set of random number packages; and
encrypting the plain data package comprises applying the plain data package, the set of secret key packages, and the set of random number packages to the system of equations for encryption.

4. The method according to claim 1, further comprising dividing plain data comprising the plain data package into a set of plain data packages for encryption.

5. The method according to claim 4, further comprising dividing the secret key into a set of secret key packages.

6. The method according to claim 5, further comprising dividing the randomization number into a set of random numbers.

7. The method according to claim 6, further comprising encrypting the set of plain data packages into sets of encrypted data packages by applying the set of plain data packages, the secret key packages, and the set of random numbers to the system of equations for encryption.

8. The method according to claim 1, wherein:
x is the plain data package;
the secret key comprises a set of secret key packages $k_1$, $k_2$, $k_3$, $k_4$, $k_5$, $k_6$, $k_7$, $k_8$, and $k_9$;
the randomization number comprises a set of random number packages $r_1$, $r_2$, $r_3$, and $r_4$; and
the system of equations for encryption comprises:

$$(k_1+r_1+r_3)\oplus k_2+k_4=m_1,$$

$$(x+r_2+r_4)\oplus k_3+k_5=m_2,$$

$$(r_1+r_2)\oplus k_6+k_7=m_3, \text{ and}$$

$$(r_3+r_4)\oplus k_8+k_9=m_4, \text{ where}$$

the encrypted data package comprises $m_1$, $m_2$, $m_3$, and $m_4$.

9. The method according to claim 1, wherein the secret key is shared between the first computing device and the second computing device.

10. The method according to claim 1, further comprising decrypting, by the second computing device, the encrypted data package to the plain data package, by application of the encrypted data package and the secret key to an equation for decryption.

11. The method according to claim 10, wherein:
x is the plain data package;
the encrypted data package comprises $m_1$, $m_2$, and $m_3$;
the secret key comprises a set of secret key packages $k_1$, $k_2$, and $k_3$; and
the equation for decryption comprises:

$$x=m_1\oplus k_2+m_2\oplus k_3-k_1-m_3.$$

12. The method according to claim 10, wherein:
x is the plain data package;
the encrypted data package comprises the numbers $m_1$, $m_2$, $m_3$, and $m_4$;
the secret key comprises a set of secret key packages $k_1$, $k_2$, $k_3$, $k_4$, $k_5$, $k_6$, $k_7$, $k_8$, and $k_9$; and
the equation for decryption comprises:

$$x=(m_1-k_4)\oplus k_2+(m_2-k_5)\oplus k_3-(m_3-k_7)\oplus k_6-(m_4-k_9)\oplus k_8-k_1.$$

13. A computing device for cryptographic communications, comprising:
a memory device configured to store computer-readable instructions thereon; and
a processing device configured, through execution of the computer-readable instructions, to:
generate a randomization number;
encrypt a plain data package into an encrypted data package by application of a system of equations to the plain data package, a secret key, and the randomization number; and
communicate the encrypted data package to a second computing device, wherein:
x is the plain data package;
the secret key comprises a set of secret key packages $k_1$, $k_2$, and $k_3$;
the randomization number comprises a set of random number packages $r_1$ and $r_2$; and
the system of equations for encryption comprises:

$$(k_1+r_1)\oplus k_2=m_1,$$

$$(x+r_2)\oplus k_3=m_2, \text{ and}$$

$$r_1+r_2=m_3, \text{ where}$$

the encrypted data package comprises $m_1$, $m_2$, $m_3$.

14. The computing device according to claim 13, wherein the system of equations comprises a system of linearly dependent equations.

15. The computing device according to claim 13, wherein:
the secret key comprises a set of secret key packages;
the randomization number comprises a set of random number packages; and
the processing device is further configured to apply the plain data package, the set of secret key packages, and the set of random number packages to the system of equations for encryption.

16. The computing device according to claim 13, wherein the processing device is further configured to divide plain data comprising the plain data package into a set of plain data packages for encryption.

17. The computing device according to claim 16, wherein the processing device is further configured to divide the secret key into a set of secret key packages.

18. The computing device according to claim 17, wherein the processing device is further configured to divide the randomization number into a set of random numbers.

19. The computing device according to claim 18, wherein the processing device is further configured to encrypt the set of plain data packages into sets of encrypted data packages by applying the set of plain data packages, the secret key packages, and the set of random numbers to the system of equations for encryption.

20. The computing device according to claim 13, wherein:
x is the plain data package;
the secret key comprises a set of secret key packages $k_1$, $k_2$, $k_3$, $k_4$, $k_5$, $k_6$, $k_7$, $k_8$, and $k_9$;
the randomization number comprises a set of random number packages $r_1$, $r_2$, $r_3$, and $r_4$; and
the system of equations for encryption comprises:

$$(k_1+r_1+r_3)\oplus k_2+k_4=m_1,$$

$$(x+r_2+r_4)\oplus k_3+k_5=m_2,$$

$$(r_1+r_2)\oplus k_6+k_7=m_3, \text{ and}$$

$$(r_3+r_4)\oplus k_8+k_9=m_4, \text{ where}$$

the encrypted data package comprises $m_1$, $m_2$, $m_3$, and ma.

21. The computing device according to claim 13, wherein the secret key is shared between the computing device and the second computing device.

22. A computing device for cryptographic communications, comprising:
- a memory device configured to store computer-readable instructions thereon; and
- a processing device configured, through execution of the computer-readable instructions, to decrypt an encrypted data package to a plain data package, by application of an equation to the encrypted data package and a secret key, wherein:
- x is the plain data package;
- the encrypted data package comprises $m_1$, $m_2$, and $m_3$;
- the secret key comprises a set of secret key packages $k_1$, $k_2$, and $k_3$; and
- the equation for decryption comprises:

$$x = m_1 \oplus k_2 + m_2 \oplus k_3 - k_1 - m_3.$$

23. A computing device for cryptographic communications, comprising:
- a memory device configured to store computer-readable instructions thereon; and
- a processing device configured, through execution of the computer-readable instructions, to decrypt an encrypted data package to a plain data package, by application of an equation to the encrypted data package and a secret key, wherein:
- x is the plain data package;
- the encrypted data package comprises $m_1$, $m_2$, $m_3$, and $m_4$;
- the secret key comprises a set of secret key packages $k_1$, $k_2$, $k_3$, $k_4$, $k_5$, $k_6$, $k_7$, $k_8$, and $k_9$; and
- the equation for decryption comprises:

$$x = (m_1 - k_4) \oplus k_2 + (m_2 - k_5) \oplus k_3 - (m_3 - k_7) \oplus k_6 - (m_4 - k_9) \oplus k_8 - k_1.$$

24. A non-transitory computer readable medium storing computer-readable instructions thereon that, when executed by a processing device, direct the processing device to:
- generate a randomization number;
- encrypt a plain data package into an encrypted data package by application of a system of equations to the plain data package, a secret key, and the randomization number; and
- communicate the encrypted data package to a second computing device, wherein:
- x is the plain data package;
- the secret key comprises a set of secret key packages $k_1$, $k_2$ and $k_3$;
- the randomization number comprises a set of random number packages $r_1$ and $r_2$; and
- the system of equations for encryption comprises:

$$(k_1 + r_1) \oplus k_2 = m_1,$$

$$(x + r_2) \oplus k_3 = m_2, \text{ and}$$

$$r_1 + r_2 = m_3, \text{ where}$$

the encrypted data package comprises $m_1$, $m_2$, $m_3$.

25. The non-transitory computer readable medium according to claim 24, wherein the system of equations comprises linearly dependent equations.

26. The non-transitory computer readable medium according to claim 24, wherein:
- the secret key comprises a set of secret key packages;
- the randomization number comprises a set of random number packages; and
- the instructions further direct the processing device to apply the plain data package, the set of secret key packages, and the set of random number packages to the system of equations for encryption.

27. The non-transitory computer readable medium according to claim 24, wherein the instructions further direct the processing device to divide plain data comprising the plain data package into a set of plain data packages for encryption.

28. The non-transitory computer readable medium according to claim 27, wherein the instructions further direct the processing device to divide the secret key into a set of secret key packages.

29. The non-transitory computer readable medium according to claim 28, wherein the instructions further direct the processing device to divide the randomization number into a set of random numbers.

30. The non-transitory computer readable medium according to claim 29, wherein the instructions further direct the processing device to encrypt the set of plain data packages into sets of encrypted data packages by applying the set of plain data packages, the secret key packages, and the set of random numbers to the system of equations for encryption.

31. The non-transitory computer readable medium according to claim 24, wherein:
- x is the plain data package;
- the secret key comprises a set of secret key packages $k_1$, $k_2$, $k_3$, $k_4$, $k_5$, $k_6$, $k_7$, $k_8$, and $k_9$;
- the randomization number comprises a set of random number packages $r_1$, $r_2$, $r_3$, and $r_4$; and
- the system of equations for encryption comprises:

$$(k_1 + r_1 + r_3) \oplus k_2 + k_4 = m_1,$$

$$(x + r_2 + r_4) \oplus k_3 + k_5 = m_2,$$

$$(r_1 + r_2) \oplus k_6 + k_7 = m_3, \text{ and}$$

$$(r_3 + r_4) \oplus k_8 + k_9 = m_4, \text{ where}$$

the encrypted data package comprises $m_1$, $m_2$, $m_3$, and $m_4$.

32. A non-transitory computer readable medium storing computer-readable instructions thereon that, when executed by a processing device, direct the processing device to:
- decrypt an encrypted data package to a plain data package, by application of an equation to the encrypted data package and a secret key, wherein:
- x is the plain data package;
- the encrypted data package comprises $m_1$, $m_2$, and $m_3$;
- the secret key comprises a set of secret key packages $k_1$, $k_2$, and $k_3$; and
- the equation for decryption comprises:

$$x = m_1 \oplus k_2 + m_2 \oplus k_3 - k_1 - m_3.$$

33. A non-transitory computer readable medium storing computer-readable instructions thereon that, when executed by a processing device, direct the processing device to:
- decrypt an encrypted data package to a plain data package, by application of an equation the encrypted data package and a secret key, wherein:
- x is the plain data package;
- the encrypted data package comprises $m_1$, $m_2$, $m_3$, and ma;

the secret key comprises a set of secret key packages $k_1$, $k_2$, $k_3$, $k_4$, $k_5$, $k_6$, $k_7$, $k_8$, and $k_9$; and
the equation for decryption comprises:

$$x=(m_1-k_4)\oplus k_2+(m_2-k_5)\oplus k_3-(m_3-k_7)\oplus k_6-(m_4-k_9)\oplus k_8-k_1.$$

\* \* \* \* \*

UNITED STATES PATENT AND TRADEMARK OFFICE
CERTIFICATE OF CORRECTION

| | |
|---|---|
| PATENT NO. | : 11,824,999 B2 |
| APPLICATION NO. | : 17/402378 |
| DATED | : November 21, 2023 |
| INVENTOR(S) | : Rustam Islamov et al. |

It is certified that error appears in the above-identified patent and that said Letters Patent is hereby corrected as shown below:

In the Specification

At Column 30, Line 67, please replace "ma" with – $m_4$ –.

Signed and Sealed this
Thirtieth Day of April, 2024

*Katherine Kelly Vidal*

Katherine Kelly Vidal
*Director of the United States Patent and Trademark Office*